US012354612B2

(12) United States Patent
Purnhagen et al.

(10) Patent No.: US 12,354,612 B2
(45) **Date of Patent: *Jul. 8, 2025**

(54) ADVANCED STEREO CODING BASED ON A COMBINATION OF ADAPTIVELY SELECTABLE LEFT/RIGHT OR MID/SIDE STEREO CODING AND OF PARAMETRIC STEREO CODING

(71) Applicant: DOLBY INTERNATIONAL AB, Dublin (IE)

(72) Inventors: Heiko Purnhagen, Sundyberg (SE); Pontus Carlsson, Bromma (SE); Kristofer Kjoerling, Solna (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 19/030,722

(22) Filed: Jan. 17, 2025

(65) Prior Publication Data

US 2025/0174234 A1 May 29, 2025

Related U.S. Application Data

(60) Continuation of application No. 18/543,365, filed on Dec. 18, 2023, which is a continuation of application (Continued)

(51) Int. Cl.
*G10L 19/002* (2013.01)
*G10L 19/008* (2013.01)
(Continued)

(52) U.S. Cl.
CPC .......... *G10L 19/002* (2013.01); *G10L 19/008* (2013.01); *H04S 3/02* (2013.01); (Continued)

(58) Field of Classification Search
CPC ..... G10L 19/002; G10L 19/008; G10L 19/18; H04S 3/02; H04S 5/00; H04S 5/005; (Continued)

(56) References Cited

U.S. PATENT DOCUMENTS

| | | | |
|---|---|---|---|
| 4,790,016 | A | 12/1988 | Mazor et al. |
| 4,914,701 | A | 4/1990 | Zibman |

(Continued)

FOREIGN PATENT DOCUMENTS

| | | | |
|---|---|---|---|
| CN | 1209718 | A | 3/1999 |
| CN | 1510662 | A | 7/2004 |

(Continued)

OTHER PUBLICATIONS

Derrien O et al: "A New Model-Based Algorithm for Optimizing the MPEG-AAC in MS-Stereo" IEEE Transactions on Audio, Speech, and Language Processing, IEEE Service Center, Newyork, NY, US, vol. 14, No. 8, Nov. 1, 2008 (Nov. 1, 2008 ), pp. 1373-1382.

(Continued)

*Primary Examiner* — Daniel R Sellers

(57) ABSTRACT

Methods and systems for advanced stereo processing of an audio signal are disclosed. The methods and systems include selecting a coding mode of either transform coding or linear predictive coding and performing advanced stereo processing when in the selected coding mode. Both encoding and decoding operations are provided.

13 Claims, 11 Drawing Sheets

Related U.S. Application Data

No. 17/728,692, filed on Apr. 25, 2022, now Pat. No. 12,223,966, which is a continuation of application No. 16/434,059, filed on Jun. 6, 2019, now Pat. No. 11,315,576, which is a division of application No. 16/369,728, filed on Mar. 29, 2019, now Pat. No. 11,017,785, which is a continuation of application No. 15/873,083, filed on Jan. 17, 2018, now Pat. No. 10,297,259, which is a continuation of application No. 14/734,088, filed on Jun. 9, 2015, now Pat. No. 9,905,230, which is a continuation of application No. 13/255,143, filed as application No. PCT/EP2010/052866 on Mar. 5, 2010, now Pat. No. 9,082,395.

(60) Provisional application No. 61/219,484, filed on Jun. 23, 2009, provisional application No. 61/160,707, filed on Mar. 17, 2009.

(51) Int. Cl.

| | |
|---|---|
| ***G10L 19/18*** | (2013.01) |
| ***H04S 3/02*** | (2006.01) |
| ***H04S 5/00*** | (2006.01) |
| ***H04S 5/02*** | (2006.01) |

(52) U.S. Cl.

CPC ................ *H04S 5/00* (2013.01); *H04S 5/005* (2013.01); *H04S 5/02* (2013.01); *G10L 19/18* (2013.01); *H04S 2400/01* (2013.01); *H04S 2400/03* (2013.01); *H04S 2420/03* (2013.01)

(58) Field of Classification Search

CPC .... H04S 5/02; H04S 2400/01; H04S 2400/03; H04S 2420/03

USPC .......................................................... 704/500

See application file for complete search history.

(56) References Cited

U.S. PATENT DOCUMENTS

| | | | | |
|---|---|---|---|---|
| 5,222,189 | A | 6/1993 | Fielder | |
| 5,274,740 | A | 12/1993 | Davis et al. | |
| 5,357,594 | A | 10/1994 | Fielder | |
| 5,394,473 | A | 2/1995 | Davidson | |
| 5,583,962 | A | 12/1996 | Davis et al. | |
| 5,636,324 | A | 6/1997 | Teh | |
| 5,890,125 | A | 3/1999 | Davis et al. | |
| 5,909,664 | A | 6/1999 | Davis et al. | |
| 6,021,386 | A | 2/2000 | Davis et al. | |
| 6,240,388 | B1 | 5/2001 | Fukuchi | |
| 6,629,078 | B1 | 9/2003 | Grill | |
| 6,708,145 | B1 | 3/2004 | Liljeryd et al. | |
| 6,978,236 | B1 | 12/2005 | Liljeryd | |
| 7,143,030 | B2 | 11/2006 | Chen | |
| 7,191,136 | B2 | 3/2007 | Sinha et al. | |
| 7,751,572 | B2 | 7/2010 | Villemoes | |
| 7,835,918 | B2 | 11/2010 | Myburg | |
| 9,082,395 | B2 | 7/2015 | Heiko | |
| 9,905,230 | B2 | 2/2018 | Purnhagen | |
| 10,297,259 | B2 | 5/2019 | Purnhagen | |
| 2002/0087304 | A1 | 7/2002 | Kjorling et al. | |
| 2002/0103637 | A1 | 8/2002 | Henn et al. | |
| 2004/0078205 | A1 | 4/2004 | Liljeryd et al. | |
| 2004/0117177 | A1 | 6/2004 | Kjorling et al. | |
| 2004/0131203 | A1 | 7/2004 | Liljeryd et al. | |
| 2004/0186735 | A1 | 9/2004 | Ferris | |
| 2005/0053242 | A1 | 3/2005 | Henn et al. | |
| 2005/0078832 | A1 | 4/2005 | Van De Par | |
| 2005/0096917 | A1 | 5/2005 | Kjorling et al. | |
| 2005/0141721 | A1 | 6/2005 | Aarts | |
| 2005/0149322 | A1 | 7/2005 | Bruhn | |
| 2005/0216262 | A1 | 9/2005 | Fejzo | |
| 2006/0031064 | A1 | 2/2006 | Liljerd | |
| 2006/0031065 | A1 | 2/2006 | Liljeryd et al. | |
| 2006/0036432 | A1 | 2/2006 | Norling et al. | |
| 2006/0053018 | A1 | 3/2006 | Engdegard et al. | |
| 2006/0190247 | A1 * | 8/2006 | Lindblom | H04S 3/008 704/230 |
| 2006/0233379 | A1 | 10/2006 | Villemoes | |
| 2007/0291951 | A1 | 12/2007 | Faller | |
| 2008/0004883 | A1 * | 1/2008 | Vilermo | G10L 19/24 704/E19.044 |
| 2008/0010061 | A1 | 1/2008 | Kjorling et al. | |
| 2008/0015868 | A1 | 1/2008 | Norling et al. | |
| 2008/0097763 | A1 | 4/2008 | Van De Par | |
| 2008/0154615 | A1 * | 6/2008 | Oomen | G10L 19/24 704/E19.044 |
| 2008/0255832 | A1 | 10/2008 | Goto | |
| 2008/0312912 | A1 | 12/2008 | Choo | |
| 2009/0041111 | A1 | 2/2009 | Liljeryd et al. | |
| 2009/0326931 | A1 | 12/2009 | Ragot et al. | |
| 2010/0153119 | A1 | 6/2010 | Lee | |
| 2010/0274557 | A1 | 10/2010 | Oh | |
| 2010/0322429 | A1 | 12/2010 | Norvell | |
| 2011/0202354 | A1 | 8/2011 | Grill | |

FOREIGN PATENT DOCUMENTS

| | | | |
|---|---|---|---|
| CN | 1677491 | A | 10/2005 |
| CN | 1276407 | C | 9/2006 |
| CN | 101010985 | A | 8/2007 |
| CN | 101366321 | A | 2/2009 |
| CN | 102388417 | B | 10/2015 |
| EP | 1107232 | A2 | 6/2001 |
| EP | 0797324 | B1 | 11/2004 |
| EP | 2235719 | A1 | 10/2010 |
| EP | 1906705 | B1 | 4/2013 |
| JP | 2002244698 | A | 8/2002 |
| JP | 2005522721 | A | 7/2005 |
| JP | 2008536184 | A | 9/2008 |
| KR | 20100106564 | A | 10/2010 |
| RU | 2006139082 | A | 5/2008 |
| WO | 2006/048226 | A1 | 5/2006 |
| WO | 2006091139 | A1 | 8/2006 |
| WO | 2006091150 | A1 | 8/2006 |
| WO | 2006103586 | A1 | 10/2006 |
| WO | 2006108462 | A1 | 10/2006 |
| WO | 2008/046530 | A2 | 4/2008 |
| WO | 2008/046531 | A1 | 4/2008 |
| WO | 2008/131903 | A1 | 11/2008 |
| WO | 2009005307 | A1 | 1/2009 |

OTHER PUBLICATIONS

Grill et al., "Scalable Joint Stereo Coding", Sep. 1, 1998, Audio Engineering Society, AES 105th Convention, Paper No. 4851, pp. 1-15. (Year: 1998).

Heinen, et al., "Transactions Papers, Source-Optimized Channel Coding for Digital Transmission Channels" IEEE Transactions on Communications, vol. 53, No. 4, Apr. 2005, pp. 592-600.

Herre et al., "Combined Stereo Coding", Oct. 4, 1992, Audio Engineering Society, AES 93rd Convention, Paper No. 3369, pp. 1-19. ( Year: 1992).

Herre, et al., "MPEG Surround-The ISO/MPEG Standard for Efficient and Compatible Multi-Channel Audio Coding" AES presentd at the 122nd Convention, May 5-8, 2007, Vienna, Austria, pp. 1-23.

Herre, et al., "MPEG-4 High-Efficiency AAC Coding" IEEE Signal Processing Magazine, IEEE Service Center, Piscataway, NJ, vol. 25, No. 3, May 1, 2008, pp. 137-142.

Herre, J., eta l. "The reference model architecture for M PEG spatial audio coding", May 31, 2005, Audio Engineering Society, 118th Convention, pp. 1-13. (Year: 2005).

ISO/I EC, International Standard—ISO/I EC 11172-3: 1993 (E)—"Information Technology—Coding of moving pictures and associated audio for digital storage media at up to about 1,5 Mbit/s—Part 3: Audio", Aug. 1, 1993, First edition, pp. i-iii, 20-23, and 33-36. (Year: 1993).

ISO/IEC, International Standard—ISO/I EC 13818-7: 1997(E)—"Information Technology—Generic coding of moving pictures and

(56) References Cited

OTHER PUBLICATIONS associated audio information—Part 7: Advanced Audio Coding (AAC)", Dec. 1, 1997, First edition, pp. i-iii, 25, and 39-47. (Year: 1997).
Johnston et al., "Sum-Difference Stereo Transform Coding," IEEE International Conference on Acoustics, Speech, and Signal Processing Mar. 23, 1992, pp. 569-572.
Meltzer, et al., "MPEG-4, HE-AAC V2-Audio Coding for Today's Digital Media World" EBU Technical Review, Jan. 31, 2006, pp. 1-12.
MPEG Surround Standard, ISO/IEC 23003-1.
MPEG-2 Advanced Audio Coding (AAC) standard, ISO/IEC 13818-7.
Neuendorf, et al., "Unified Speech and Audio Coding Scheme for High Quality at Low Bitrates" Acoustics, Speech and Signal Processing, 2009. ICASSP 2009, Apr. 19, 2009, pp. 1-4.
Purnhagen H: "Low complexity parametric stereo coding in mpeg-4" Proceedings of the International Conference on Digital Audioeffects, Oct. 5, 2004 (Oct. 5, 2004), pp. 163-168.
Schuijers, et al., "Low Complexity Parametric Stereo Coding" AES Convention Paper 6073, presented at the 116th Convention, May 8-11, 2004, Berlin, Germany.
Shin, et al., "Designing a Unified Speech/Audio Codec by Adopting a Single Channel Harmonic Source Separation Module" Acoustics, Speech and Signal Processing, 2008. IEEE International Conference on IEEE, Piscataway, NJ, USA, Mar. 31, 2008, pp. 185-188.

* cited by examiner

ADVANCED STEREO CODING BASED ON A COMBINATION OF ADAPTIVELY SELECTABLE LEFT/RIGHT OR MID/SIDE STEREO CODING AND OF PARAMETRIC STEREO CODING

CROSS-REFERENCE TO RELATED APPLICATIONS

This application is a continuation of U.S. patent application Ser. No. 18/543,365 filed Dec. 18, 2023, which is a continuation of U.S. patent application Ser. No. 17/728,692 filed Apr. 25, 2022, which is a continuation of U.S. patent application Ser. No. 16/434,059 filed Jun. 6, 2019, now U.S. Pat. No. 11,315,576 issued on Apr. 26, 2022, which is a divisional of U.S. patent application Ser. No. 16/369,728 filed Mar. 29, 2019, now issued U.S. Pat. No. 11,017,785 issued on May 25, 2021, which is a continuation of U.S. patent application Ser. No. 15/873,083 filed Jan. 17, 2018, now issued U.S. Pat. No. 10,297,259 issued on May 21, 2019, which is a continuation of U.S. patent application Ser. No. 14/734,088 filed on Jun. 9, 2015, now issued U.S. Pat. No. 9,905,230 issued on Feb. 27, 2018, which is continuation of U.S. patent application Ser. No. 13/255,143 filed on Sep. 12, 2011, now issued U.S. Pat. No. 9,082,395 issued on Jul. 14, 2015, which is the 371 national stage of PCT application No. PCT/EP2010/052866 filed Mar. 5, 2010, which claims the benefit of the filing date of U.S. Provisional Patent Application No. 61/219,484 filed on Jun. 23, 2009 and U.S. Provisional Patent Application No. 61/160,707 filed on Mar. 17, 2009, each of which are hereby incorporated by reference in their entirety.

TECHNICAL FIELD

The application relates to audio coding, in particular to stereo audio coding combining parametric and waveform based coding techniques.

BACKGROUND OF THE INVENTION

Joint coding of the left (L) and right (R) channels of a stereo signal enables more efficient coding compared to independent coding of L and R. A common approach for joint stereo coding is mid/side (M/S) coding. Here, a mid (M) signal is formed by adding the L and R signals, e.g. the M signal may have the form $$M = \frac{1}{2}(L + R)$$

Also, a side (S) signal is formed by subtracting the two channels L and R, e.g. the S signal may have the form $$S = \frac{1}{2}(L - R).$$

In case of M/S coding, the M and S signals are coded instead of the L and R signals.

In the MPEG (Moving Picture Experts Group) AAC (Advanced Audio Coding) standard (see standard document ISO/IEC 13818-7), L/R stereo coding and M/S stereo coding can be chosen in a time-variant and frequency-variant manner. Thus, the stereo encoder can apply L/R coding for some frequency bands of the stereo signal, whereas M/S coding is used for encoding other frequency bands of the stereo signal (frequency variant). Moreover, the encoder can switch over time between L/R and M/S coding (time-variant). In MPEG AAC, the stereo encoding is carried out in the frequency domain, more particularly in the MDCT (modified discrete cosine transform) domain. This allows to adaptive choose either L/R or M/S coding in a frequency and also time variant manner. The decision between L/R and M/S stereo encoding may be based by evaluating the side signal: when the energy of the side signal is low, M/S stereo encoding is more efficient and should be used. Alternatively, for deciding between both stereo coding schemes, both coding schemes may be tried out and the selection may be based on the resulting quantization efforts, i.e., the observed perceptual entropy.

An alternative approach to joint stereo coding is parametric stereo (PS) coding. Here, the stereo signal is conveyed as a mono downmix signal after encoding the downmix signal with a conventional audio encoder such as an AAC encoder. The downmix signal is a superposition of the L and R channels. The mono downmix signal is conveyed in combination with additional time-variant and frequency-variant PS parameters, such as the inter-channel (i.e. between L and R) intensity difference (IID) and the inter-channel cross-correlation (ICC). In the decoder, based on the decoded downmix signal and the parametric stereo parameters a stereo signal is reconstructed that approximates the perceptual stereo image of the original stereo signal. For reconstructing, a decorrelated version of the downmix signal is generated by a decorrelator. Such decorrelator may be realized by an appropriate all-pass filter. PS encoding and decoding is described in the paper "Low Complexity Parametric Stereo Coding in MPEG-4", H. Purnhagen, Proc. Of the $7^{th}$ Int. Conference on Digital Audio Effects (DAFx'04), Naples, Italy, Oct. 5-8, 2004, pages 163-168. The disclosure of this document is hereby incorporated by reference.

The MPEG Surround standard (see document ISO/IEC 23003-1) makes use of the concept of PS coding. In an MPEG Surround decoder a plurality of output channels is created based on fewer input channels and control parameters. MPEG Surround decoders and encoders are constructed by cascading parametric stereo modules, which in MPEG Surround are referred to as OTT modules (One-To-Two modules) for the decoder and R-OTT modules (Reverse-One-To-Two modules) for the encoder. An OTT module determines two output channels by means of a single input channel (downmix signal) accompanied by PS parameters. An OTT module corresponds to a PS decoder and an R-OTT module corresponds to a PS encoder. Parametric stereo can be realized by using MPEG Surround with a single OTT module at the decoder side and a single R-OTT module at the encoder side; this is also referred to as "MPEG Surround 2-1-2" mode. The bitstream syntax may differ, but the underlying theory and signal processing are the same. Therefore, in the following all the references to PS also include "MPEG Surround 2-1-2" or MPEG Surround based parametric stereo.

In a PS encoder (e.g. in a MPEG Surround PS encoder) a residual signal (RES) may be determined and transmitted in addition to the downmix signal. Such residual signal indicates the error associated with representing original channels by their downmix and PS parameters. In the decoder the residual signal may be used instead of the decorrelated version of the downmix signal. This allows to better reconstruct the waveforms of the original channels L and R. The use of an additional residual signal is e.g. described in the MPEG Surround standard (see document ISO/IEC 23003-1)

and in the paper "MPEG Surround—The ISO/MPEG Standard for Efficient and Compatible Multi-Channel Audio Coding, J. Herre et al., Audio Engineering Convention Paper 7084, 122nd Convention, May 5-8, 2007. The disclosure of both documents, in particular the remarks to the residual signal therein, is herewith incorporated by reference.

PS coding with residual is a more general approach to joint stereo coding than M/S coding: M/S coding performs a signal rotation when transforming L/R signals into M/S signals. Also, PS coding with residual performs a signal rotation when transforming the L/R signals into downmix and residual signals. However, in the latter case the signal rotation is variable and depends on the PS parameters. Due to the more general approach of PS coding with residual, PS coding with residual allows a more efficient coding of certain types of signals like a paned mono signal than M/S coding. Thus, the proposed coder allows to efficiently combine parametric stereo coding techniques with waveform based stereo coding techniques.

Often, perceptual stereo encoders, such as an MPEG AAC perceptual stereo encoder, can decide between L/R stereo encoding and M/S stereo encoding, where in the latter case a mid/side signal is generated based on the stereo signal. Such selection may be frequency-variant, i.e. for some frequency bands L/R stereo encoding may be used, whereas for other frequency bands M/S stereo encoding may be used.

In a situation where the L and R channels are basically independent signals, such perceptual stereo encoder would typically not use M/S stereo encoding since in this situation such encoding scheme does not offer any coding gain in comparison to L/R stereo encoding. The encoder would fall back to plain L/R stereo encoding, basically processing L and R independently.

In the same situation, a PS encoder system would create a downmix signal that contains both the L and R channels, which prevents independent processing of the L and R channels. For PS coding with a residual signal, this can imply less efficient coding compared to stereo encoding, where L/R stereo encoding or M/S stereo encoding is adaptively selectable.

Thus, there are situations where a PS coder outperforms a perceptual stereo coder with adaptive selection between L/R stereo encoding and M/S stereo encoding, whereas in other situations the latter coder outperforms the PS coder.

SUMMARY OF THE INVENTION

The present application describes an audio encoder system and an encoding method that are based on the idea of combing PS coding using a residual with adaptive L/R or M/S perceptual stereo coding (e.g. AAC perceptual joint stereo coding in the MDCT domain). This allows to combine the advantages of adaptive L/R or M/S stereo coding (e.g. used in MPEG AAC) and the advantages of PS coding with a residual signal (e.g. used in MPEG Surround). Moreover, the application describes a corresponding audio decoder system and a decoding method.

A first aspect of the application relates to an encoder system for encoding a stereo signal to a bitstream signal. According to an embodiment of the encoder system, the encoder system comprises a downmix stage for generating a downmix signal and a residual signal based on the stereo signal. The residual signal may cover all or only a part of the used audio frequency range. In addition, the encoder system comprises a parameter determining stage for determining PS parameters such as an inter-channel intensity difference and an inter-channel cross-correlation. Preferably, the PS parameters are frequency-variant. Such downmix stage and the parameter determining stage are typically part of a PS encoder.

In addition, the encoder system comprises perceptual encoding means downstream of the downmix stage, wherein two encoding schemes are selectable:

- encoding based on a sum of the downmix signal and the residual signal and based on a difference of the downmix signal and the residual signal or
- encoding based on the downmix signal and based on the residual signal.

It should be noted that in case encoding is based on the downmix signal and the residual signal, the downmix signal and the residual signal may be encoded or signals proportional thereto may be encoded. In case encoding is based on a sum and on a difference, the sum and difference may be encoded or signals proportional thereto may be encoded.

The selection may be frequency-variant (and time-variant), i.e. for a first frequency band it may be selected that the encoding is based on a sum signal and a difference signal, whereas for a second frequency band it may be selected that the encoding is based on the downmix signal and based on the residual signal.

Such encoder system has the advantage that is allows to switch between L/R stereo coding and PS coding with residual (preferably in a frequency-variant manner): If the perceptual encoding means select (for a particular band or for the whole used frequency range) encoding based on downmix and residual signals, the encoding system behaves like a system using standard PS coding with residual. However, if the perceptual encoding means select (for a particular band or for the whole used frequency range) encoding based on a sum signal of the downmix signal and the residual signal and based on a difference signal of the downmix signal and the residual signal, under certain circumstances the sum and difference operations essentially compensate the prior downmix operation (except for a possibly different gain factor) such that the overall system can actually perform L/R encoding of the overall stereo signal or for a frequency band thereof. E.g. such circumstances occur when the L and R channels of the stereo signal are independent and have the same level as will be explained in detail later on.

Preferably, the adaption of the encoding scheme is time and frequency dependent. Thus, preferably some frequency bands of the stereo signal are encoded by a L/R encoding scheme, whereas other frequency bands of the stereo signal are encoded by a PS coding scheme with residual.

It should be noted that in case the encoding is based on the downmix signal and based on the residual signal as discussed above, the actual signal which is input to the core encoder may be formed by two serial operations on the downmix signal and residual signal which are inverse (except for a possibly different gain factor). E.g. a downmix signal and a residual signal are fed to an M/S to L/R transform stage and then the output of the transform stage is fed to a L/R to M/S transform stage. The resulting signal (which is then used for encoding) corresponds to the downmix signal and the residual signal (expect for a possibly different gain factor).

The following embodiment makes use of this idea. According to an embodiment of the encoder system, the encoder system comprises a downmix stage and a parameter determining stage as discussed above. Moreover, the encoder system comprises a transform stage (e.g. as part of the encoding means discussed above). The transform stage generates a pseudo L/R stereo signal by performing a transform of the downmix signal and the residual signal. The transform stage preferably performs a sum and difference transform, where the downmix signal and the residual signals are summed to generate one channel of the pseudo stereo signal (possibly, the sum is also multiplied by a factor) and subtracted from each other to generate the other channel of the pseudo stereo signal (possibly, the difference is also multiplied by a factor). Preferably, a first channel (e.g. the pseudo left channel) of the pseudo stereo signal is proportional to the sum of the downmix and residual signals, where a second channel (e.g. the pseudo right channel) is proportional to the difference of the downmix and residual signals. Thus, the downmix signal DMX and residual signal RES from the PS encoder may be converted into a pseudo stereo signal $L_p$, $R_p$ according to the following equations:

$$L_p = g\,(DMX + RES)$$

$$R_p = g\,(DMX - RES)$$

In the above equations the gain normalization factor g has e.g. a value of g=½.

The pseudo stereo signal is preferably processed by a perceptual stereo encoder (e.g. as part of the encoding means). For encoding, L/R stereo encoding or M/S stereo encoding is selectable. The adaptive L/R or M/S perceptual stereo encoder may be an AAC based encoder. Preferably, the selection between L/R stereo encoding and M/S stereo encoding is frequency-variant; thus, the selection may vary for different frequency bands as discussed above. Also, the selection between L/R encoding and M/S encoding is preferably time-variant. The decision between L/R encoding and M/S encoding is preferably made by the perceptual stereo encoder.

Such perceptual encoder having the option for M/S encoding can internally compute (pseudo) M and S signals (in the time domain or in selected frequency bands) based on the pseudo stereo L/R signal. Such pseudo M and S signals correspond to the downmix and residual signals (except for a possibly different gain factor). Hence, if the perceptual stereo encoder selects M/S encoding, it actually encodes the downmix and residual signals (which correspond to the pseudo M and S signals) as it would be done in a system using standard PS coding with residual.

Moreover, under special circumstances the transform stage essentially compensates the prior downmix operation (except for a possibly different gain factor) such that the overall encoder system can actually perform L/R encoding of the overall stereo signal or for a frequency band thereof (if L/R encoding is selected in the perceptual encoder). This is e.g. the case when the L and R channels of the stereo signal are independent and have the same level as will be explained in detail later on. Thus, for a given frequency band the pseudo stereo signal essentially corresponds or is proportional to the stereo signal, if—for the frequency band—the left and right channels of the stereo signal are essentially independent and have essentially the same level.

Thus, the encoder system actually allows to switch between L/R stereo coding and PS coding with residual, in order to be able to adapt to the properties of the given stereo input signal. Preferably, the adaption of the encoding scheme is time and frequency dependent. Thus, preferably some frequency bands of the stereo signal are encoded by a L/R encoding scheme, whereas other frequency bands of the stereo signal are encoded by a PS coding scheme with residual. It should be noted that M/S coding is basically a special case of PS coding with residual (since the L/R to M/S transform is a special case of the PS downmix operation) and thus the encoder system may also perform overall M/S coding.

Said embodiment having the transform stage downstream of the PS encoder and upstream of the L/R or M/S perceptual stereo encoder has the advantage that a conventional PS encoder and a conventional perceptual encoder can be used. Nevertheless, the PS encoder or the perceptual encoder may be adapted due to the special use here.

The new concept improves the performance of stereo coding by enabling an efficient combination of PS coding and joint stereo coding.

According to an alternative embodiment, the encoding means as discussed above comprise a transform stage for performing a sum and difference transform based on the downmix signal and the residual signal for one or more frequency bands (e.g. for the whole used frequency range or only for one frequency range). The transform may be performed in a frequency domain or in a time domain. The transform stage generates a pseudo left/right stereo signal for the one or more frequency bands. One channel of the pseudo stereo signal corresponds to the sum and the other channel corresponds to the difference.

Thus, in case encoding is based on the sum and difference signals the output of the transform stage may be used for encoding, whereas in case encoding is based on the downmix signal and the residual signal the signals upstream of the encoding stage may be used for encoding. Thus, this embodiment does not use two serial sum and difference transforms on the downmix signal and residual signal, resulting in the downmix signal and residual signal (except for a possibly different gain factor).

When selecting encoding based on the downmix signal and residual signal, parametric stereo encoding of the stereo signal is selected. When selecting encoding based on the sum and difference (i.e. encoding based on the pseudo stereo signal) L/R encoding of the stereo signal is selected.

The transform stage may be a L/R to M/S transform stage as part of a perceptual encoder with adaptive selection between L/R and M/S stereo encoding (possibly the gain factor is different in comparison to a conventional L/R to M/S transform stage). It should be noted that the decision between L/R and M/S stereo encoding should be inverted. Thus, encoding based on the downmix signal and residual signal is selected (i.e. the encoded signal did not pass the transform stage) when the decision means decide M/S perceptual decoding, and encoding based on the pseudo stereo signal as generated by the transform stage is selected (i.e. the encoded signal passed the transform stage) when the decision means decide L/R perceptual decoding.

The encoder system according to any of the embodiments discussed above may comprise an additional SBR (spectral band replication) encoder. SBR is a form of HFR (High Frequency Reconstruction). An SBR encoder determines side information for the reconstruction of the higher frequency range of the audio signal in the decoder. Only the lower frequency range is encoded by the perceptual encoder, thereby reducing the bitrate. Preferably, the SBR encoder is connected upstream of the PS encoder. Thus, the SBR encoder may be in the stereo domain and generates SBR parameters for a stereo signal. This will be discussed in detail in connection with the drawings.

Preferably, the PS encoder (i.e. the downmix stage and the parameter determining stage) operates in an oversampled frequency domain (also the PS decoder as discussed below preferably operates in an oversampled frequency domain). For time-to-frequency transform e.g. a complex valued hybrid filter bank having a QMF (quadrature mirror filter) and a Nyquist filter may be used upstream of the PS encoder as described in MPEG Surround standard (see document ISO/IEC 23003-1). This allows for time and frequency adaptive signal processing without audible aliasing artifacts. The adaptive L/R or M/S encoding, on the other hand, is preferably carried out in the critically sampled MDCT domain (e.g. as described in AAC) in order to ensure an efficient quantized signal representation.

The conversion between downmix and residual signals and the pseudo L/R stereo signal may be carried out in the time domain since the PS encoder and the perceptual stereo encoder are typically connected in the time domain anyway. Thus, the transform stage for generating the pseudo L/R signal may operate in the time domain.

In other embodiments as discussed in connection with the drawings, the transform stage operates in an oversampled frequency domain or in a critically sampled MDCT domain.

A second aspect of the application relates to a decoder system for decoding a bitstream signal as generated by the encoder system discussed above.

According to an embodiment of the decoder system, the decoder system comprises perceptual decoding means for decoding based on the bitstream signal. The decoding means are configured to generate by decoding an (internal) first signal and an (internal) second signal and to output a downmix signal and a residual signal. The downmix signal and the residual signal is selectively

- based on the sum of the first signal and of the second signal and based on the difference of the first signal and of the second signal or
- based on the first signal and based on the second signal.

As discussed above in connection with the encoder system, also here the selection may be frequency-variant or frequency-invariant.

Moreover, the system comprises an upmix stage for generating the stereo signal based on the downmix signal and the residual signal, with the upmix operation of the upmix stage being dependent on the one or more parametric stereo parameters.

Analogously to the encoder system, the decoder system allows to actually switch between L/R decoding and PS decoding with residual, preferably in a time and frequency variant manner.

According to another embodiment, the decoder system comprises a perceptual stereo decoder (e.g. as part of the decoding means) for decoding the bitstream signal, with the decoder generating a pseudo stereo signal. The perceptual decoder may be an AAC based decoder. For the perceptual stereo decoder, L/R perceptual decoding or M/S perceptual decoding is selectable in a frequency-variant or frequency-invariant manner (the actual selection is preferably controlled by the decision in the encoder which is conveyed as side-information in the bitstream). The decoder selects the decoding scheme based on the encoding scheme used for encoding. The used encoding scheme may be indicated to the decoder by information contained in the received bitstream.

Moreover, a transform stage is provided for generating a downmix signal and a residual signal by performing a transform of the pseudo stereo signal. In other words: The pseudo stereo signal as obtained from the perceptual decoder is converted back to the downmix and residual signals. Such transform is a sum and difference transform: The resulting downmix signal is proportional to the sum of a left channel and a right channel of the pseudo stereo signal. The resulting residual signal is proportional to the difference of the left channel and the right channel of the pseudo stereo signal. Thus, quasi an L/R to M/S transform was carried out. The pseudo stereo signal with the two channels $L_p$, $R_p$ may be converted to the downmix and residual signals according to the following equations:

$$DMX = \frac{1}{2g}(L_p + R_p)$$

$$RES = \frac{1}{2g}(L_p - R_p)$$

In the above equations the gain normalization factor g may have e.g. a value of g=½. The residual signal RES used in the decoder may cover the whole used audio frequency range or only a part of the used audio frequency range.

The downmix and residual signals are then processed by an upmix stage of a PS decoder to obtain the final stereo output signal. The upmixing of the downmix and residual signals to the stereo signal is dependent on the received PS parameters.

According to an alternative embodiment, the perceptual decoding means may comprise a sum and difference transform stage for performing a transform based on the first signal and the second signal for one or more frequency bands (e.g. for the whole used frequency range). Thus, the transform stage generates the downmix signal and the residual signal for the case that the downmix signal and the residual signal are based on the sum of the first signal and of the second signal and based on the difference of the first signal and of the second signal. The transform stage may operate in the time domain or in a frequency domain.

As similarly discussed in connection with the encoder system, the transform stage may be a M/S to L/R transform stage as part of a perceptual decoder with adaptive selection between L/R and M/S stereo decoding (possibly the gain factor is different in comparison to a conventional M/S to L/R transform stage). It should be noted that the selection between L/R and M/S stereo decoding should be inverted.

The decoder system according to any of the preceding embodiments may comprise an additional SBR decoder for decoding the side information from the SBR encoder and generating a high frequency component of the audio signal. Preferably, the SBR decoder is located downstream of the PS decoder. This will be discussed in detail in connection with drawings.

Preferably, the upmix stage operates in an oversampled frequency domain, e.g. a hybrid filter bank as discussed above may be used upstream of the PS decoder.

The L/R to M/S transform may be carried out in the time domain since the perceptual decoder and the PS decoder (including the upmix stage) are typically connected in the time domain.

In other embodiments as discussed in connection with the drawings, the L/R to M/S transform is carried out in an oversampled frequency domain (e.g., QMF), or in a critically sampled frequency domain (e.g., MDCT).

A third aspect of the application relates to a method for encoding a stereo signal to a bitstream signal. The method operates analogously to the encoder system discussed above. Thus, the above remarks related to the encoder system are basically also applicable to encoding method.

A fourth aspect of the invention relates to a method for decoding a bitstream signal including PS parameters to generate a stereo signal. The method operates in the same way as the decoder system discussed above. Thus, the above remarks related to the decoder system are basically also applicable to decoding method.

The invention is explained below by way of illustrative examples with reference to the accompanying drawings, wherein FIG. 1 illustrates an embodiment of an encoder system, where optionally the PS parameters assist the psycho-acoustic control in the perceptual stereo encoder;

Figure 9A:
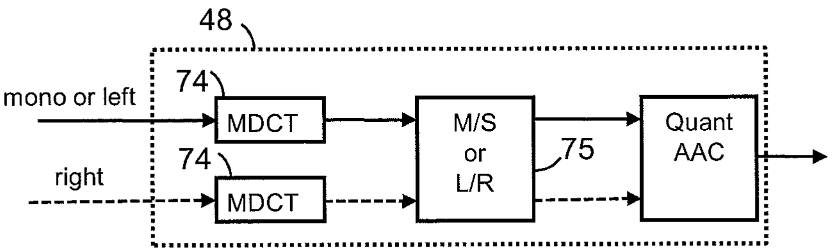
Figure 9B:
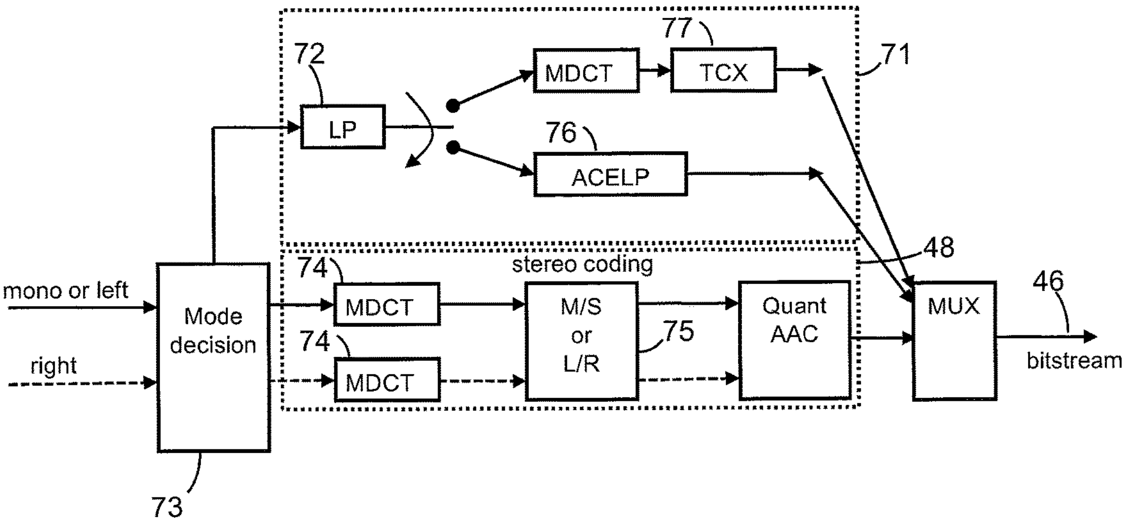
Figure 10:
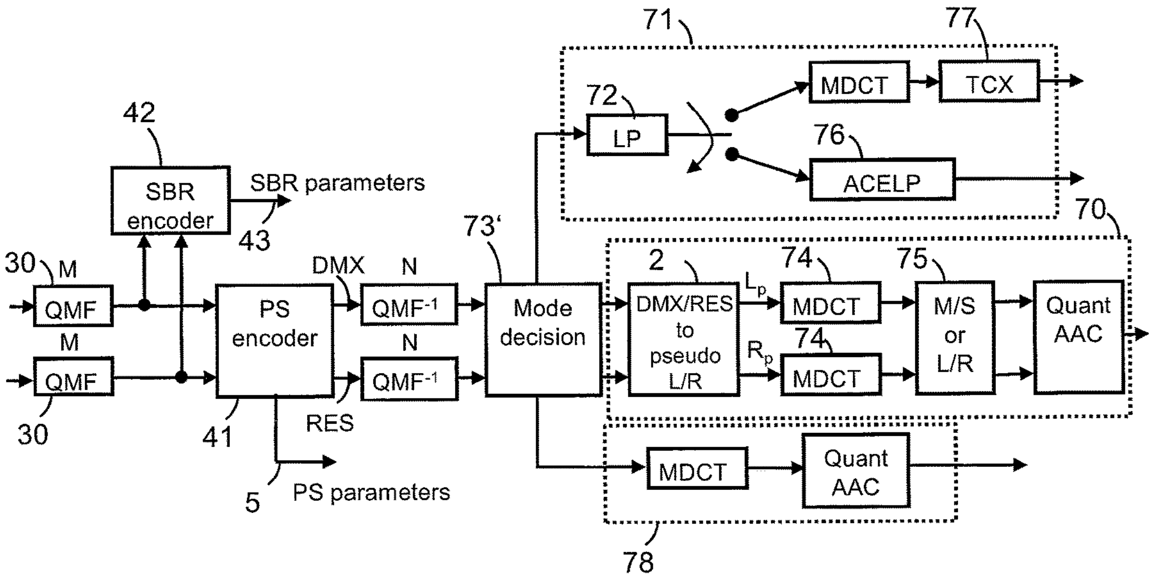
Figure 11A:
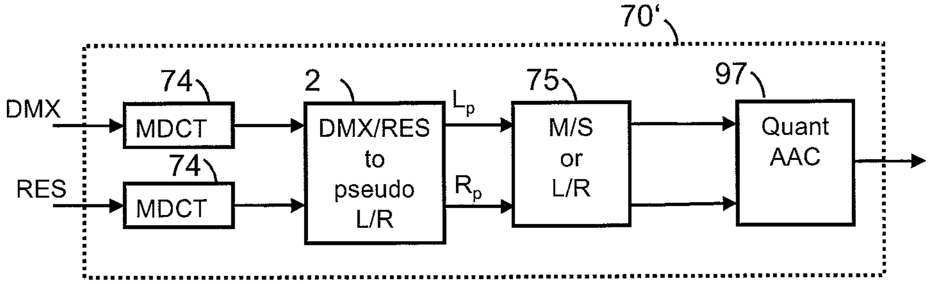
Figure 11B:
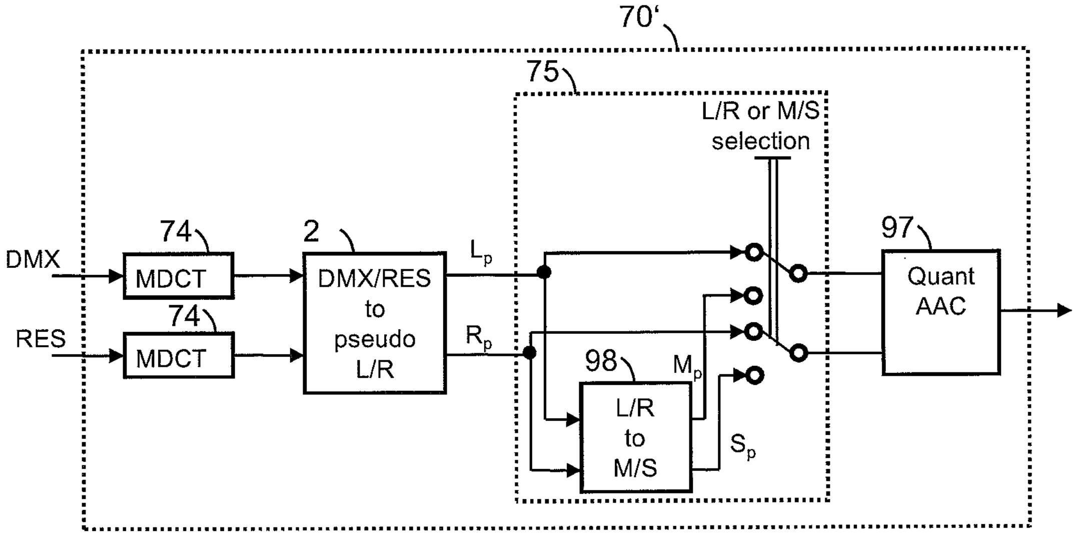

FIGS. 8*a*-8*d* illustrate various time-frequency representations of one of the two output channels at the decoder output;

FIG. 9*a* illustrates an embodiment of the core encoder;

FIG. 9*b* illustrates an embodiment of an encoder that permits switching between coding in a linear predictive domain (typically for mono signals only) and coding in a transform domain (typically for both mono and stereo signals);

FIG. 10 illustrates an embodiment of an encoder system;

FIG. 11*a* illustrates a part of an embodiment of an encoder system;

FIG. 11*b* illustrates an exemplary implementation of the embodiment in FIG. 11*a;*

Figure 11C:
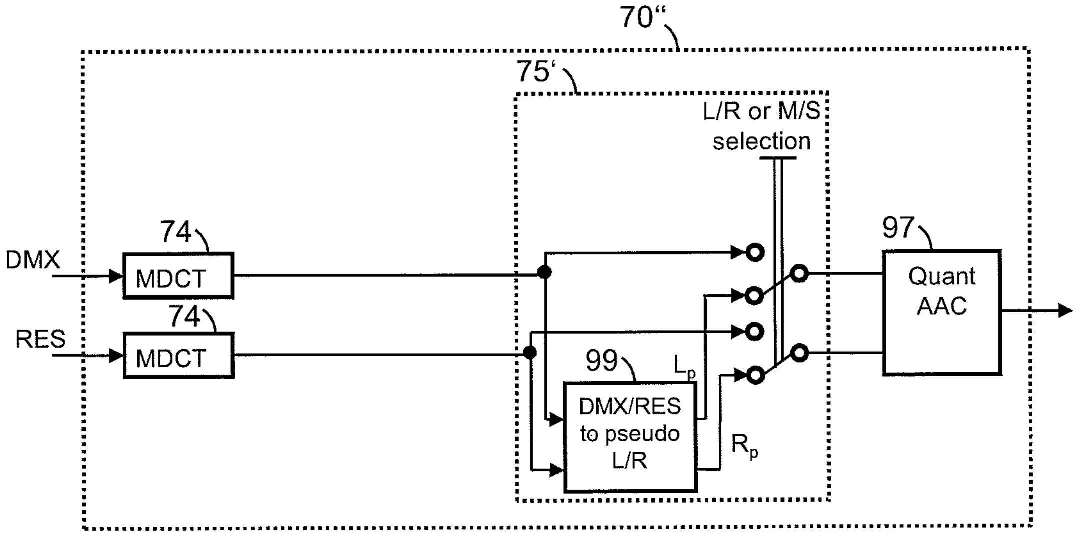

FIG. 11*c* illustrates an alternative to the embodiment in FIG. 11*a;*

Figure 6:
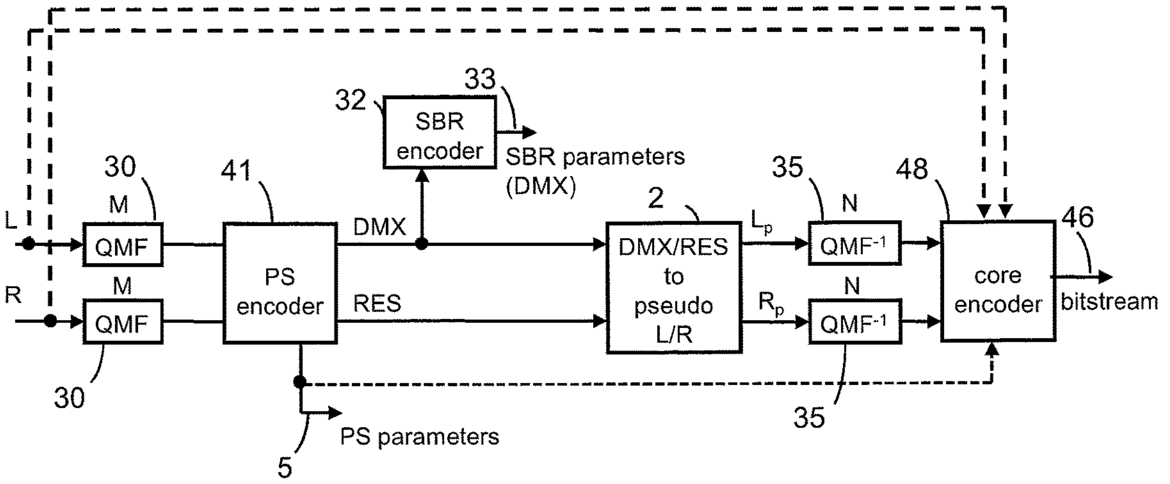
FIG. 6 illustrates an embodiment of an encoder system having an additional SBR encoder for the downmix signal.
Figure 7:
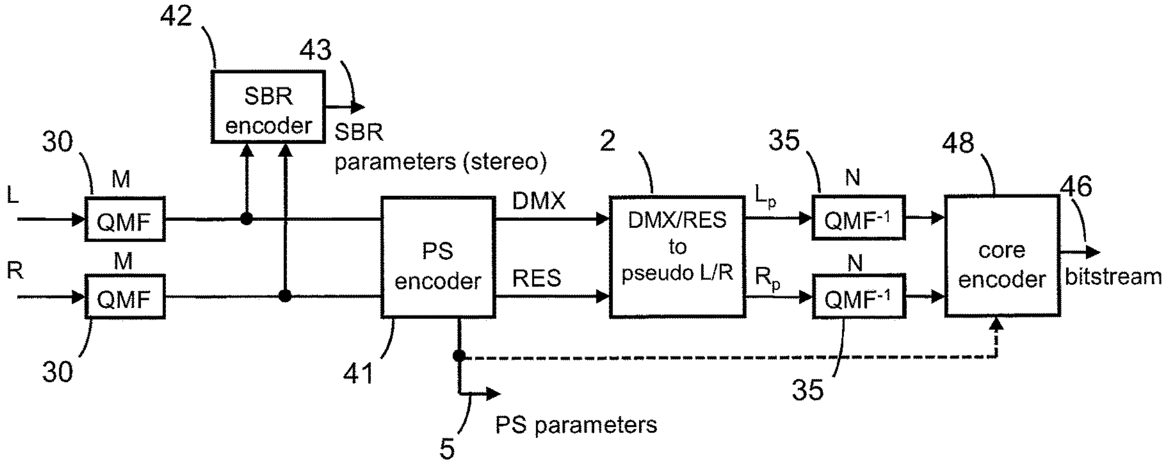
FIG. 7 illustrates an embodiment of an encoder system having an additional SBR encoder in the stereo domain.
Figure 12:
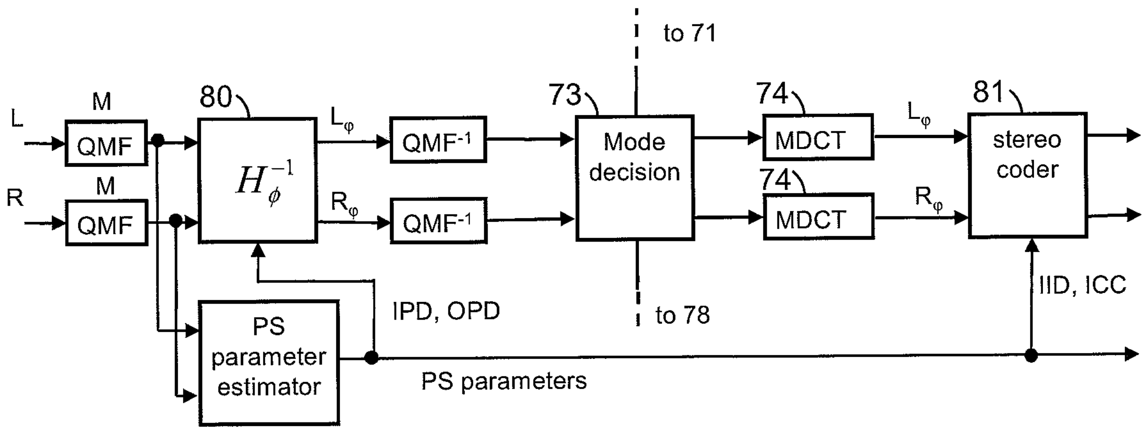
Figure 13:
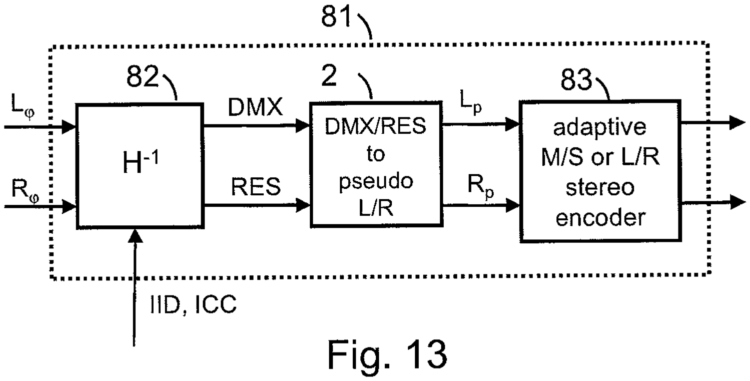
Figure 14:
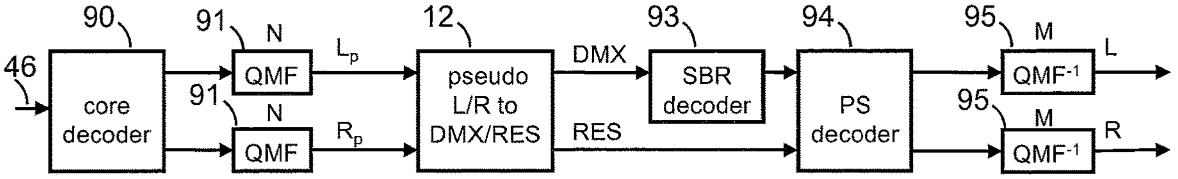
Figure 15:
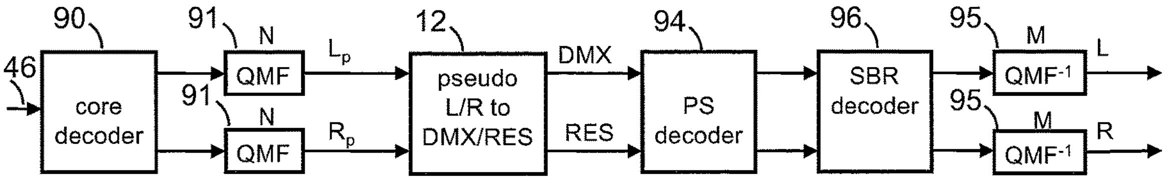
Figure 16A:
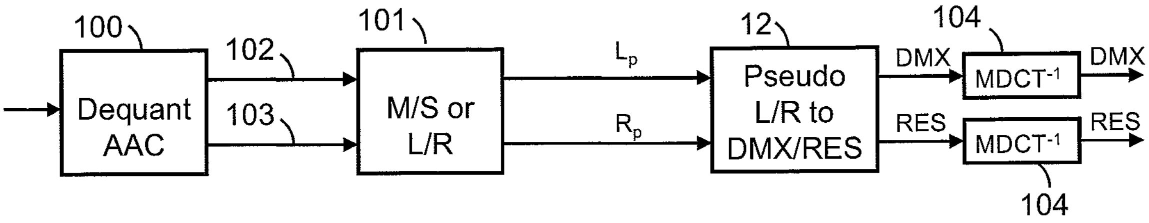
Figure 16B:
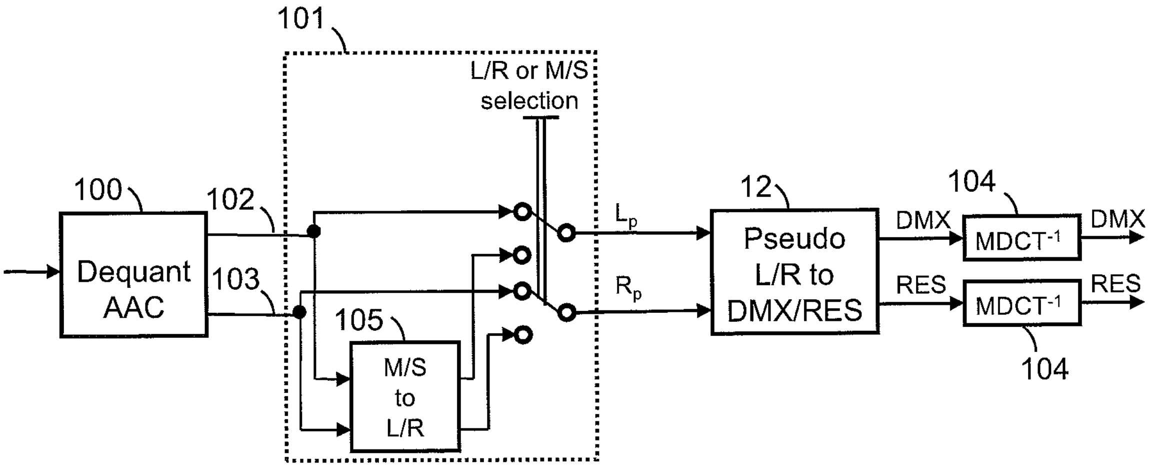

FIG. 12 illustrates an embodiment of an encoder system;

FIG. 13 illustrates an embodiment of the stereo coder as part of the encoder system of FIG. 12;

FIG. 14 illustrates an embodiment of a decoder system for decoding the bitstream signal as generated by the encoder system of FIG. 6;

FIG. 15 illustrates an embodiment of a decoder system for decoding the bitstream signal as generated by the encoder system of FIG. 7;

FIG. 16*a* illustrates a part of an embodiment of a decoder system;

FIG. 16*b* illustrates an exemplary implementation of the embodiment in FIG. 16*a;*

Figure 16C:
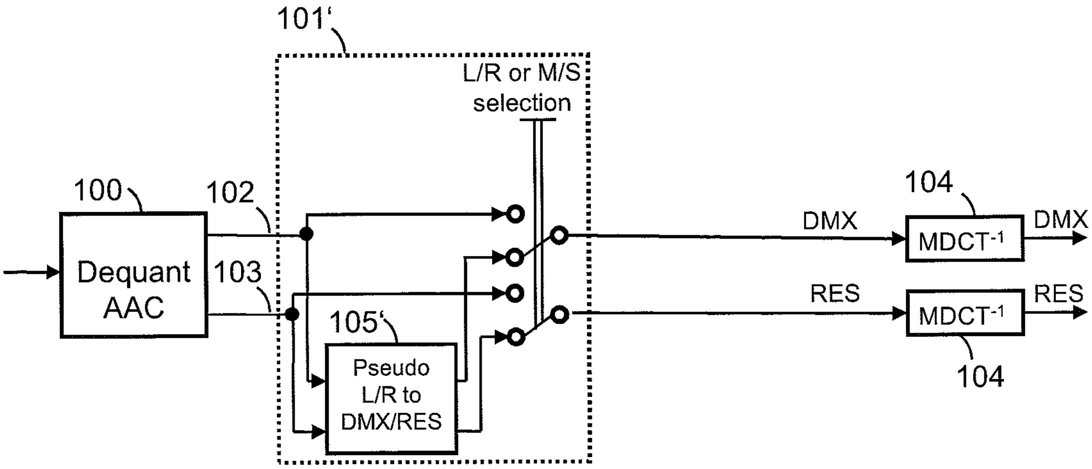

FIG. 16*c* illustrates an alternative to the embodiment in FIG. 16*a;*

Figure 17:
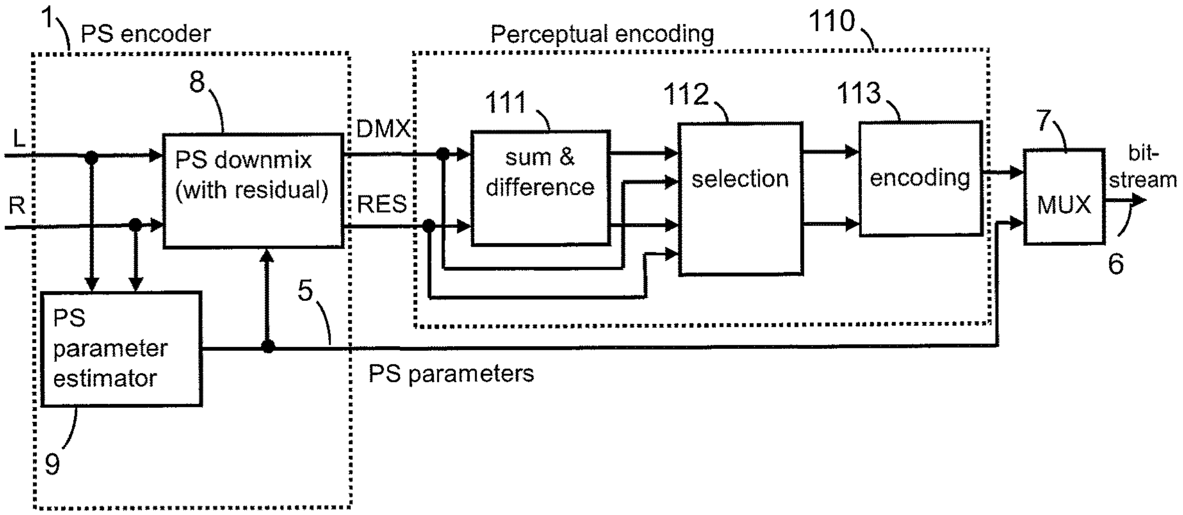

FIG. 17 illustrates an embodiment of an encoder system; and

Figure 18:
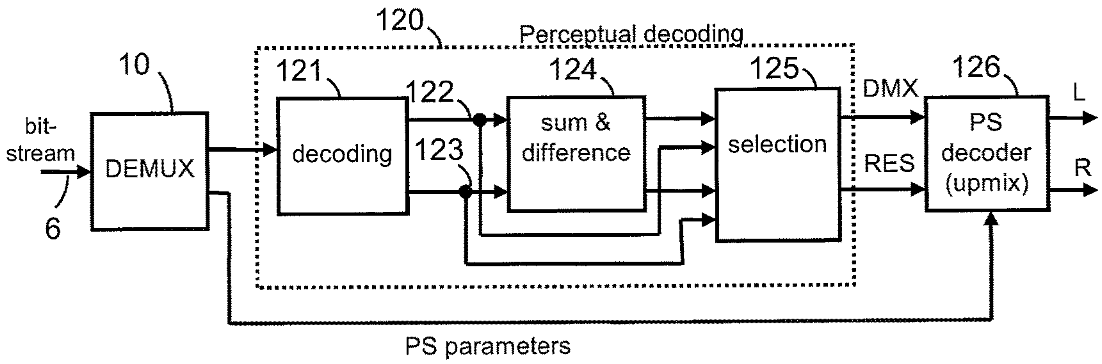

FIG. 18 illustrates an embodiment of a decoder system.

Figure 1:
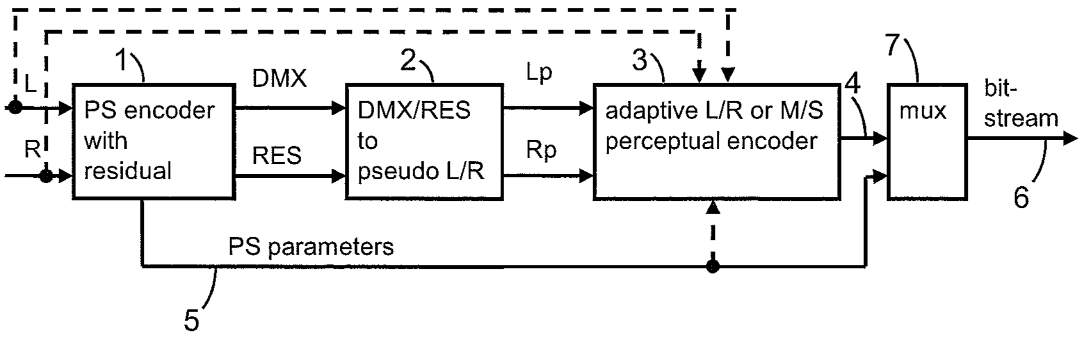

FIG. 1 shows an embodiment of an encoder system which combines PS encoding using a residual with adaptive L/R or M/S perceptual stereo encoding. This embodiment is merely illustrative for the principles of the present application. It is understood that modifications and variations of the embodiment will be apparent to others skilled in the art. The encoder system comprises a PS encoder 1 receiving a stereo signal L, R. The PS encoder 1 has a downmix stage for generating downmix DMX and residual RES signals based on the stereo signal L, R. This operation can be described by means of a 2·2 downmix matrix $H^{-1}$ that converts the L and R signals to the downmix signal DMX and residual signal RES:

$$\begin{pmatrix} DMX \\ RES \end{pmatrix} = H^{-1} \cdot \begin{pmatrix} L \\ R \end{pmatrix}$$

Typically, the matrix $H^{-1}$ is frequency-variant and time-variant, i.e. the elements of the matrix $H^{-1}$ vary over frequency and vary from time slot to time slot. The matrix $H^{-1}$ may be updated every frame (e.g. every 21 or 42 ms) and may have a frequency resolution of a plurality of bands, e.g. 28, 20, or 10 bands (named "parameter bands") on a perceptually oriented (Bark-like) frequency scale.

The elements of the matrix $H^{-1}$ depend on the time- and frequency-variant PS parameters IID (inter-channel intensity difference; also called CLD—channel level difference) and ICC (inter-channel cross-correlation). For determining PS parameters 5, e.g. IID and ICC, the PS encoder 1 comprises a parameter determining stage. An example for computing the matrix elements of the inverse matrix H is given by the following and described in the MPEG Surround specification document ISO/IEC 23003-1, subclause 6.5.3.2 which is hereby incorporated by reference:

$$H = \begin{bmatrix} c_1 \cos(\alpha+\beta) & c_1 \sin(\alpha+\beta) \\ c_2 \cos(-\alpha+\beta) & c_2 \sin(-\alpha+\beta) \end{bmatrix},$$

where $$c_1 = \sqrt{\frac{10^{\frac{CLD}{10}}}{1+10^{\frac{CLD}{10}}}}, \text{ and } c_2 = \sqrt{\frac{1}{1+10^{\frac{CLD}{10}}}},$$

and where $$\beta = \arctan\left(\tan(\alpha)\frac{c_2-c_1}{c_2+c_1}\right), \text{ and } \alpha = \frac{1}{2}\arccos(\rho),$$

and where ρ=ICC.

Moreover, the encoder system comprises a transform stage 2 that converts the downmix signal DMX and residual signal RES from the PS encoder 1 into a pseudo stereo signal $L_p$, $R_p$, e.g. according to the following equations:

$$L_p = g\,(DMX + RES)$$

$$R_p = g\,(DMX - RES)$$

In the above equations the gain normalization factor g has e.g. a value of g=½. For g=½, the two equations for pseudo stereo signal $L_p$, $R_p$ can be rewritten as:

$$\begin{pmatrix} L_p \\ R_p \end{pmatrix} = \begin{pmatrix} \sqrt{1/2} & \sqrt{1/2} \\ \sqrt{1/2} & -\sqrt{1/2} \end{pmatrix} \begin{pmatrix} DMX \\ RES \end{pmatrix}$$

The pseudo stereo signal $L_p$, $R_p$ is then fed to a perceptual stereo encoder 3, which adaptively selects either L/R or M/S stereo encoding. M/S encoding is a form of joint stereo coding. L/R encoding may be also based on joint encoding aspects, e.g. bits may be allocated jointly for the L and R channels from a common bit reservoir.

The selection between L/R or M/S stereo encoding is preferably frequency-variant, i.e. some frequency bands may be L/R encoded, whereas other frequency bands may be M/S encoded. An embodiment for implementing the selection between L/R or M/S stereo encoding is described in the document "Sum-Difference Stereo Transform Coding", J. D. Johnston et al., IEEE International Conference on Acoustics, Speech, and Signal Processing (ICASSP) 1992, pages 569-572. The discussion of the selection between L/R or M/S stereo encoding therein, in particular sections 5.1 and 5.2, is hereby incorporated by reference.

Based on the pseudo stereo signal $L_p$, $R_p$, the perceptual encoder 3 can internally compute (pseudo) mid/side signals $M_p$, $S_p$. Such signals basically correspond to the downmix signal DMX and residual signal RES (except for a possibly different gain factor). Hence, if the perceptual encoder 3 selects M/S encoding for a frequency band, the perceptual encoder 3 basically encodes the downmix signal DMX and residual signal RES for that frequency band (except for a possibly different gain factor) as it also would be done in a conventional perceptual encoder system using conventional PS coding with residual. The PS parameters 5 and the output bitstream 4 of the perceptual encoder 3 are multiplexed into a single bitstream 6 by a multiplexer 7.

In addition to PS encoding of the stereo signal, the encoder system in FIG. 1 allows L/R coding of the stereo signal as will be explained in the following: As discussed above, the elements of the downmix matrix $H^{-1}$ of the encoder (and also of the upmix matrix H used in the decoder) depend on the time- and frequency-variant PS parameters IID (inter-channel intensity difference; also called CLD—channel level difference) and ICC (inter-channel cross-correlation). An example for computing the matrix elements of the upmix matrix H is described above. In case of using residual coding, the right column of the 2·2 upmix matrix H is given as $$\begin{pmatrix} 1 \\ -1 \end{pmatrix}.$$

However, preferably, the right column of the 2·2 matrix H should instead be modified to $$\begin{pmatrix} \sqrt{1/2} \\ -\sqrt{1/2} \end{pmatrix}.$$

The left column is preferably computed as given in the MPEG Surround specification.

Modifying the right column of the upmix matrix H ensures that for IID=0 dB and ICC=0 (i.e. the case where for the respective band the stereo channels L and R are independent and have the same level) the following upmix matrix H is obtained for the band:

$$H = \begin{pmatrix} \sqrt{1/2} & \sqrt{1/2} \\ \sqrt{1/2} & -\sqrt{1/2} \end{pmatrix}.$$

Please note that the upmix matrix H and also the downmix matrix $H^{-1}$ are typically frequency-variant and time-variant. Thus, the values of the matrices are different for different time/frequency tiles (a tile corresponds to the intersection of a particular frequency band and a particular time period). In the above case the downmix matrix $H^{-1}$ is identical to the upmix matrix H. Thus, for the band the pseudo stereo signal $L_p$, $R_p$ can computed by the following equation:

$$\begin{pmatrix} L_p \\ R_p \end{pmatrix} = \begin{pmatrix} \sqrt{1/2} & \sqrt{1/2} \\ \sqrt{1/2} & -\sqrt{1/2} \end{pmatrix} \begin{pmatrix} DMX \\ RES \end{pmatrix} = \begin{pmatrix} \sqrt{1/2} & \sqrt{1/2} \\ \sqrt{1/2} & -\sqrt{1/2} \end{pmatrix} \cdot H^{-1} \cdot \begin{pmatrix} L \\ R \end{pmatrix} =$$

$$\begin{pmatrix} \sqrt{1/2} & \sqrt{1/2} \\ \sqrt{1/2} & -\sqrt{1/2} \end{pmatrix} \begin{pmatrix} \sqrt{1/2} & \sqrt{1/2} \\ \sqrt{1/2} & -\sqrt{1/2} \end{pmatrix} \begin{pmatrix} L \\ R \end{pmatrix} = \begin{pmatrix} 1 & 0 \\ 0 & 1 \end{pmatrix} \begin{pmatrix} L \\ R \end{pmatrix} = \begin{pmatrix} L \\ R \end{pmatrix}$$

Hence, in this case the PS encoding with residual using the downmix matrix $H^{-1}$ followed by the generation of the pseudo L/R signal in the transform stage 2 corresponds to the unity matrix and does not change the stereo signal for the respective frequency band at all, i.e.

$$L_p = L$$

$$R_p = R$$

In other words: the transform stage 2 compensates the downmix matrix $H^{-1}$ such that the pseudo stereo signal $L_p$, $R_p$ corresponds to the input stereo signal L, R. This allows to encode the original input stereo signal L, R by the perceptual encoder 3 for the particular band. When L/R encoding is selected by the perceptual encoder 3 for encoding the particular band, the encoder system behaves like a L/R perceptual encoder for encoding the band of the stereo input signal L, R.

The encoder system in FIG. 1 allows seamless and adaptive switching between L/R coding and PS coding with residual in a frequency- and time-variant manner. The encoder system avoids discontinuities in the waveform when switching the coding scheme. This prevents artifacts. In order to achieve smooth transitions, linear interpolation may be applied to the elements of the matrix $H^{1}$ in the encoder and the matrix H in the decoder for samples between two stereo parameter updates.

Figure 2:
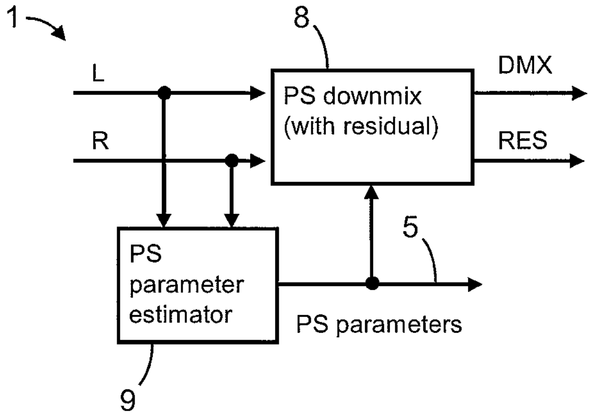
FIG. 2 illustrates an embodiment of the PS encoder.

FIG. 2 shows an embodiment of the PS encoder 1. The PS encoder 1 comprises a downmix stage 8 which generates the downmix signal DMX and residual signal RES based on the stereo signal L, R. Further, the PS encoder 1 comprises a parameter estimating stage 9 for estimating the PS parameters 5 based on the stereo signal L, R.

Figure 3:
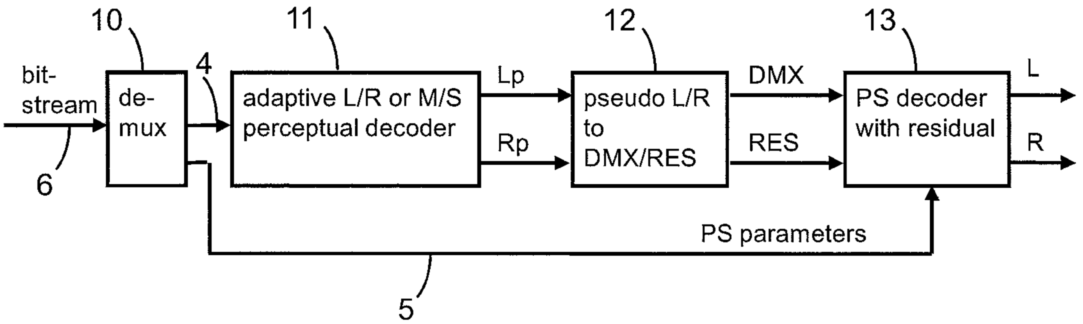
FIG. 3 illustrates an embodiment of a decoder system.

FIG. 3 illustrates an embodiment of a corresponding decoder system configured to decode the bitstream 6 as generated by the encoder system of FIG. 1. This embodiment is merely illustrative for the principles of the present application. It is understood that modifications and variations of the embodiment will be apparent to others skilled in the art. The decoder system comprises a demultiplexer 10 for separating the PS parameters 5 and the audio bitstream 4 as generated by the perceptual encoder 3. The audio bitstream 4 is fed to a perceptual stereo decoder 11, which can selectively decode an L/R encoded bitstream or an M/S encoded audio bitstream. The operation of the decoder 11 is inverse to the operation of the encoder 3. Analogously to the perceptual encoder 3, the perceptual decoder 11 preferably allows for a frequency-variant and time-variant decoding scheme. Some frequency bands which are L/R encoded by the encoder 3 are L/R decoded by the decoder 11, whereas other frequency bands which are M/S encoded by the encoder 3 are M/S decoded by the decoder 11. The decoder 11 outputs the pseudo stereo signal $L_p$, $R_p$ which was input to the perceptual encoder 3 before. The pseudo stereo signal $L_p$, $R_p$ as obtained from the perceptual decoder 11 is converted back to the downmix signal DMX and residual signal RES by a L/R to M/S transform stage 12. The operation of the L/R to M/S transform stage 12 at the decoder side is inverse to the operation of the transform stage 2 at the encoder side. Preferably, the transform stage 12 determines the downmix signal DMX and residual signal RES according to the following equations:

$$DMX = \frac{1}{2g}(L_p + R_p)$$

$$RES = \frac{1}{2g}(L_p - R_p)$$

In the above equations, the gain normalization factor g is identical to the gain normalization factor g at the encoder side and has e.g. a value of g=½.

The downmix signal DMX and residual signal RES are then processed by the PS decoder 13 to obtain the final L and R output signals. The upmix step in the decoding process for PS coding with a residual can be described by means of the 2·2 upmix matrix H that converts the downmix signal DMX and residual signal RES back to the L and R channels:

$$\begin{pmatrix} L \\ R \end{pmatrix} = H \cdot \begin{pmatrix} DMX \\ RES \end{pmatrix}.$$

The computation of the elements of the upmix matrix H was already discussed above.

The PS encoding and PS decoding process in the PS encoder 1 and the PS decoder 13 is preferably carried out in an oversampled frequency domain. For time-to-frequency transform e.g. a complex valued hybrid filter bank having a QMF (quadrature mirror filter) and a Nyquist filter may be used upstream of the PS encoder, such as the filter bank described in MPEG Surround standard (see document ISO/IEC 23003-1). The complex QMF representation of the signal is oversampled with factor 2 since it is complex-valued and not real-valued. This allows for time and frequency adaptive signal processing without audible aliasing artifacts. Such hybrid filter bank typically provides high frequency resolution (narrow band) at low frequencies, while at high frequency, several QMF bands are grouped into a wider band. The paper "Low Complexity Parametric Stereo Coding in MPEG-4", H. Purnhagen, Proc. of the 7$^{th}$ Int. Conference on Digital Audio Effects (DAFx'04), Naples, Italy, Oct. 5-8, 2004, pages 163-168 describes an embodiment of a hybrid filter bank (see section 3.2 and FIG. 4). This disclosure is hereby incorporated by reference. In this document a 48 kHz sampling rate is assumed, with the (nominal) bandwidth of a band from a 64 band QMF bank being 375 Hz. The perceptual Bark frequency scale however asks for a bandwidth of approximately 100 Hz for frequencies below 500 Hz. Hence, the first 3 QMF bands may be split into further more narrow subbands by means of a Nyquist filter bank. The first QMF band may be split into 4 bands (plus two more for negative frequencies), and the 2nd and 3rd QMF bands may be split into two bands each.

Preferably, the adaptive L/R or M/S encoding, on the other hand, is carried out in the critically sampled MDCT domain (e.g. as described in AAC) in order to ensure an efficient quantized signal representation. The conversion of the downmix signal DMX and residual signal RES to the pseudo stereo signal $L_p$, $R_p$ in the transform stage 2 may be carried out in the time domain since the PS encoder 1 and the perceptual encoder 3 may be connected in the time domain anyway. Also in the decoding system, the perceptual stereo decoder 11 and the PS decoder 13 are preferably connected in the time domain. Thus, the conversion of the pseudo stereo signal $L_p$, $R_p$ to the downmix signal DMX and residual signal RES in the transform stage 12 may be also carried out in the time domain.

An adaptive L/R or M/S stereo coder such as shown as the encoder 3 in FIG. 1 is typically a perceptual audio coder that incorporates a psychoacoustic model to enable high coding efficiency at low bitrates. An example for such encoder is an AAC encoder, which employs transform coding in a critically sampled MDCT domain in combination with time- and frequency-variant quantization controlled by using a psycho-acoustic model. Also, the time- and frequency-variant decision between L/R and M/S coding is typically controlled with help of perceptual entropy measures that are calculated using a psycho-acoustic model.

The perceptual stereo encoder (such as the encoder 3 in FIG. 1) operates on a pseudo L/R stereo signal (see $L_p$, $R_p$ in FIG. 1). For optimizing the coding efficiency of the stereo encoder (in particular for making the right decision between L/R encoding and M/S encoding) it is advantageous to modify the psycho-acoustic control mechanism (including the control mechanism which decides between L/R and M/S stereo encoding and the control mechanism which controls the time- and frequency-variant quantization) in the perceptual stereo encoder in order to account for the signal modifications (pseudo L/R to DMX and RES conversion, followed by PS decoding) that are applied in the decoder when generating the final stereo output signal L, R. These signal modifications can affect binaural masking phenomena that are exploited in the psycho-acoustic control mechanisms. Therefore, these psycho-acoustic control mechanisms should preferably be adapted accordingly. For this, it can be beneficial if the psycho-acoustic control mechanisms do not have access only to the pseudo L/R signal (see $L_p$, $R_p$ in FIG. 1) but also to the PS parameters (see 5 in FIG. 1) and/or to the original stereo signal L, R. The access of the psycho-acoustic control mechanisms to the PS parameters and to the stereo signal L, R is indicated in FIG. 1 by the dashed lines. Based on this information, e.g. the masking threshold(s) may be adapted.

An alternative approach to optimize psycho-acoustic control is to augment the encoder system with a detector forming a deactivation stage that is able to effectively deactivate PS encoding when appropriate, preferably in a time- and frequency-variant manner. Deactivating PS encoding is e.g. appropriate when L/R stereo coding is expected to be beneficial or when the psycho-acoustic control would have problems to encode the pseudo L/R signal efficiently. PS encoding may be effectively deactivated by setting the downmix matrix $H^{-1}$ in such a way that the downmix matrix $H^{-1}$ followed by the transform (see stage 2 in FIG. 1) corresponds to the unity matrix (i.e. to an identity operation) or to the unity matrix times a factor. E.g. PS encoding may be effectively deactivated by forcing the PS parameters IID and/or ICC to IID=0 dB and ICC=0. In this case the pseudo stereo signal $L_p$, $R_p$ corresponds to the stereo signal L, R as discussed above.

Figure 4:
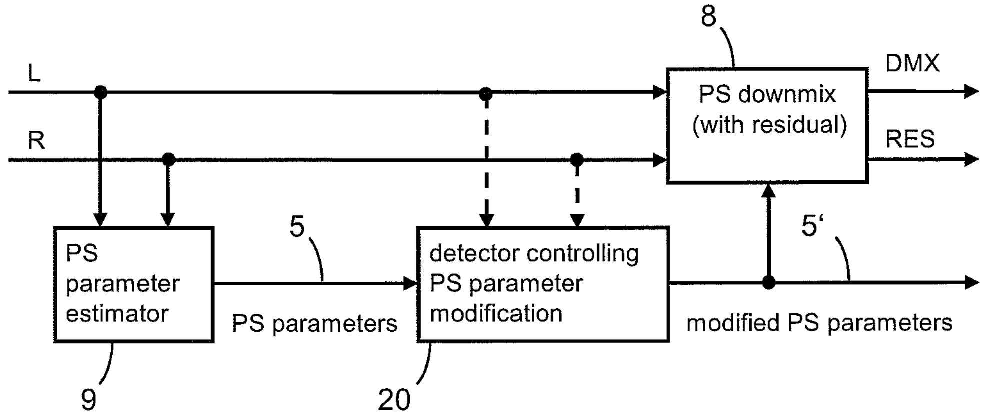
FIG. 4 illustrates a further embodiment of the PS encoder including a detector to deactivate PS encoding if L/R encoding is beneficial.

Such detector controlling a PS parameter modification is shown in FIG. 4. Here, the detector 20 receives the PS parameters 5 determined by the parameter estimating stage 9. When the detector does not deactivate the PS encoding, the detector 20 passes the PS parameters through to the downmix stage 8 and to the multiplexer 7, i.e. in this case the PS parameters 5 correspond to the PS parameters 5' fed to the downmix stage 8. In case the detector detects that PS encoding is disadvantageous and PS encoding should be deactivated (for one or more frequency bands), the detector modifies the affected PS parameters 5 (e.g. set the PS parameters IID and/or ICC to IID=0 dB and ICC=0) and feeds the modified PS parameters 5' to downmix stage 8. The detector can optionally also consider the left and right signals L, R for deciding on a PS parameter modification (see dashed lines in FIG. 4).

In the following figures, the term QMF (quadrature mirror filter or filter bank) also includes a QMF subband filter bank in combination with a Nyquist filter bank, i.e. a hybrid filter bank structure. Furthermore, all values in the description below may be frequency dependent, e.g. different downmix and upmix matrices may be extracted for different frequency ranges. Furthermore, the residual coding may only cover part of the used audio frequency range (i.e. the residual signal is only coded for a part of the used audio frequency range). Aspects of downmix as will be outlined below may for some frequency ranges occur in the QMF domain (e.g. according to prior art), while for other frequency ranges only e.g. phase aspects will be dealt with in the complex QMF domain, whereas amplitude transformation is dealt with in the real-valued MDCT domain.

Figure 5:
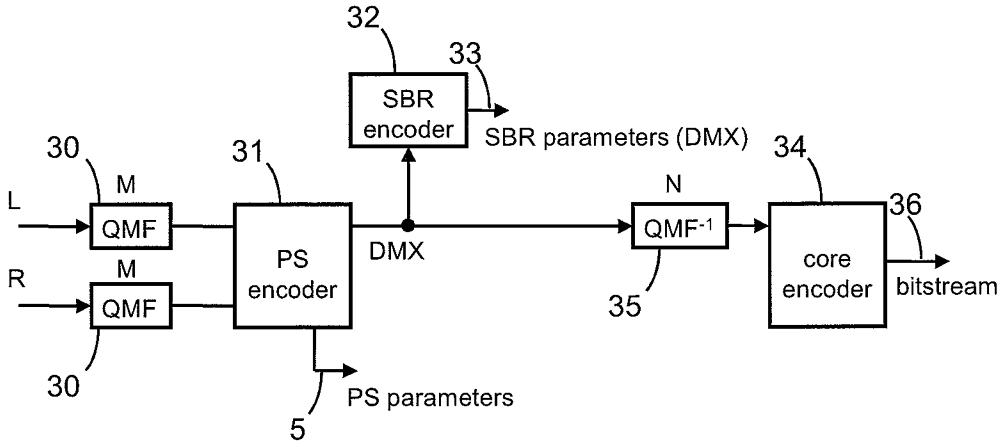
FIG. 5 illustrates an embodiment of a conventional PS encoder system having an additional SBR encoder for the downmix.

In FIG. 5, a conventional PS encoder system is depicted. Each of the stereo channels L, R, is at first analyzed by a complex QMF 30 with M subbands, e.g. a QMF with M=64 subbands. The subband signals are used to estimate PS parameters 5 and a downmix signal DMX in a PS encoder 31. The downmix signal DMX is used to estimate SBR (Spectral Bandwidth Replication) parameters 33 in an SBR encoder 32. The SBR encoder 32 extracts the SBR parameters 33 representing the spectral envelope of the original high band signal, possibly in combination with noise and tonality measures. As opposed to the PS encoder 31, the SBR encoder 32 does not affect the signal passed on to the core coder 34. The downmix signal DMX of the PS encoder 31 is synthesized using an inverse QMF 35 with N subbands. E.g. a complex QMF with N=32 may be used, where only the 32 lowest subbands of the 64 subbands used by the PS encoder 31 and the SBR encoder 32 are synthesized. Thus, by using half the number of subbands for the same frame size, a time domain signal of half the bandwidth compared to the input is obtained, and passed into the core coder 34. Due to the reduced bandwidth the sampling rate can be reduced to the half (not shown). The core encoder 34 performs perceptual encoding of the mono input signal to generate a bitstream 36. The PS parameters 5 are embedded in the bitstream 36 by a multiplexer (not shown).

FIG. 6 shows a further embodiment of an encoder system which combines PS coding using a residual with a stereo core coder 48, with the stereo core coder 48 being capable of adaptive L/R or M/S perceptual stereo coding. This embodiment is merely illustrative for the principles of the present application. It is understood that modifications and variations of the embodiment will be apparent to others skilled in the art. The input channels L, R representing the left and right original channels are analyzed by a complex QMF 30, in a similar way as discussed in connection with FIG. 5. In contrast to the PS encoder 31 in FIG. 5, the PS encoder 41 in FIG. 6 does not only output a downmix signal DMX but also outputs a residual signal RES. The downmix signal DMX is used by an SBR encoder 32 to determine SBR parameters 33 of the downmix signal DMX. A fixed DMX/RES to pseudo L/R transform (i.e. an M/S to L/R transform) is applied to the downmix DMX and the residual RES signals in a transform stage 2. The transform stage 2 in FIG. 6 corresponds to the transform stage 2 in FIG. 1. The transform stage 2 creates a “pseudo” left and right channel signal $L_p$, $R_p$ for the core encoder 48 to operate on. In this embodiment, the inverse L/R to M/S transform is applied in the QMF domain, prior to the subband synthesis by filter banks 35. Preferably, the number N (e.g. N=32) of subbands for the synthesis corresponds to half the number M (e.g. M=64) of subbands used for the analysis and the core coder 48 operates at half the sampling rate. It should be noted that there is no restriction to use 64 subband channels for the QMF analysis in the encoder, and 32 subbands for the synthesis, other values are possible as well, depending on which sampling rate is desired for the signal received by the core coder 48. The core stereo encoder 48 performs perceptual encoding of the signal of the filter banks 35 to generate a bitstream signal 46. The PS parameters 5 are embedded in the bitstream signal 46 by a multiplexer (not shown). Optionally, the PS parameters and/or the original L/R input signal may be used by the core encoder 48. Such information indicates to the core encoder 48 how the PS encoder 41 rotated the stereo space. The information may guide the core encoder 48 how to control quantization in a perceptually optimal way. This is indicated in FIG. 6 by the dashed lines.

FIG. 7 illustrates a further embodiment of an encoder system which is similar to the embodiment in FIG. 6. In comparison to the embodiment of FIG. 6, in FIG. 7 the SBR encoder 42 is connected upstream of the PS encoder 41. In FIG. 7 the SBR encoder 42 has been moved prior to the PS encoder 41, thus operating on the left and right channels (here: in the QMF domain), instead of operating on the downmix signal DMX as in FIG. 6.

Due to the re-arrangement of the SBR encoder 42, the PS encoder 41 may be configured to operate not on the full bandwidth of the input signal but e.g. only on the frequency range below the SBR crossover frequency. In FIG. 7, the SBR parameters 43 are in stereo for the SBR range, and the output from the corresponding PS decoder as will be discussed later on in connection with FIG. 15 produces a stereo source frequency range for the SBR decoder to operate on. This modification, i.e. connecting the SBR encoder module 42 upstream of the PS encoder module 41 in the encoder system and correspondingly placing the SBR decoder module after the PS decoder module in the decoder system (see FIG. 15), has the benefit that the use of a decorrelated signal for generating the stereo output can be reduced. Please note that in case no residual signal exists at all or for a particular frequency band, a decorrelated version of the downmix signal DMX is used instead in the PS decoder. However, a reconstruction based on a decorrelated signal reduces the audio quality. Thus, reducing the use of the decorrelated signal increases the audio quality.

This advantage of the embodiment in FIG. 7 in comparison to the embodiment in FIG. 6 will be now explained more in detail with reference to FIGS. 8*a* to 8*d*.

Figure 8A:
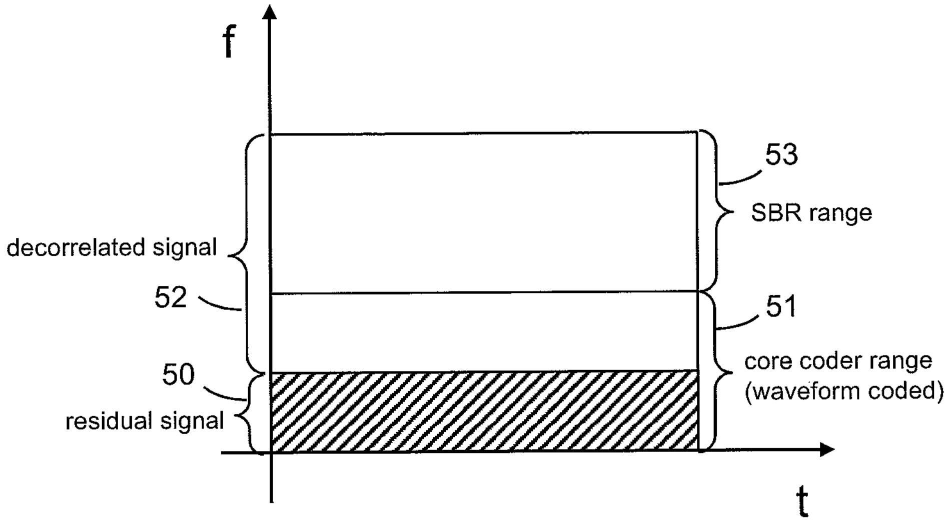

In FIG. 8*a*, a time frequency representation of one of the two output channels L, R (at the decoder side) is visualized. In case of FIG. 8*a*, an encoder is used where the PS encoding module is placed in front of the SBR encoding module such as the encoder in FIG. 5 or FIG. 6 (in the decoder the PS decoder is placed after the SBR decoder, see FIG. 14). Moreover, the residual is coded only in a low bandwidth frequency range 50, which is smaller than the frequency range 51 of the core coder. As evident from the spectrogram visualization in FIG. 8*a*, the frequency range 52 where a decorrelated signal is to be used by the PS decoder covers all of the frequency range apart from the lower frequency range

50 covered by the use of the residual signal. Moreover, the SBR covers a frequency range 53 starting significantly higher than that of the decorrelated signal. Thus, the entire frequency range separates in the following frequency ranges: in the lower frequency range (see range 50 in FIG. 8*a*), waveform coding is used; in the middle frequency range (see intersection of frequency ranges 51 and 52), waveform coding in combination with a decorrelated signal is used; and in the higher frequency range (see frequency range 53), a SBR regenerated signal which is regenerated from the lower frequencies is used in combination with the decorrelated signal produced by the PS decoder.

Figure 8B:
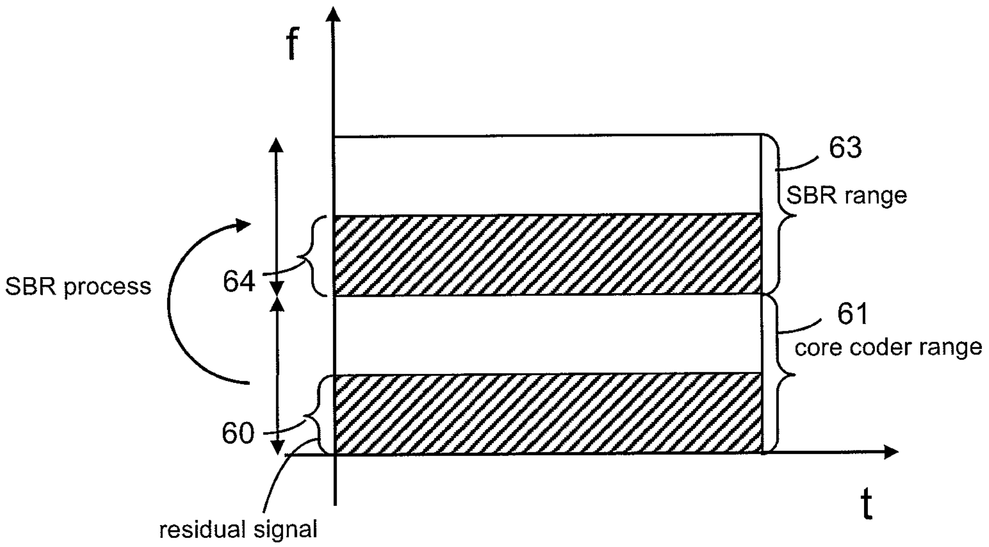

In FIG. 8*b*, a time frequency representation of one of the two output channels L, R (at the decoder side) is visualized for the case when the SBR encoder is connected upstream of the PS encoder in the encoder system (and the SBR decoder is located after the PS decoder in the decoder system). In FIG. 8*b* a low bitrate scenario is illustrated, with the residual signal bandwidth 60 (where residual coding is performed) being lower than the bandwidth of the core coder 61. Since the SBR decoding process operates on the decoder side after the PS decoder (see FIG. 15), the residual signal used for the low frequencies is also used for the reconstruction of at least a part (see frequency range 64) of the higher frequencies in the SBR range 63.

Figure 8C:
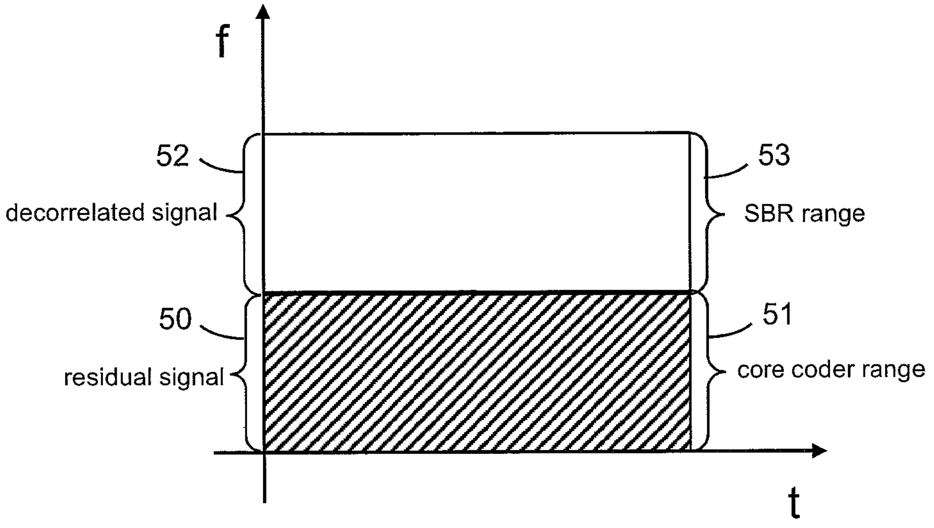
Figure 8D:
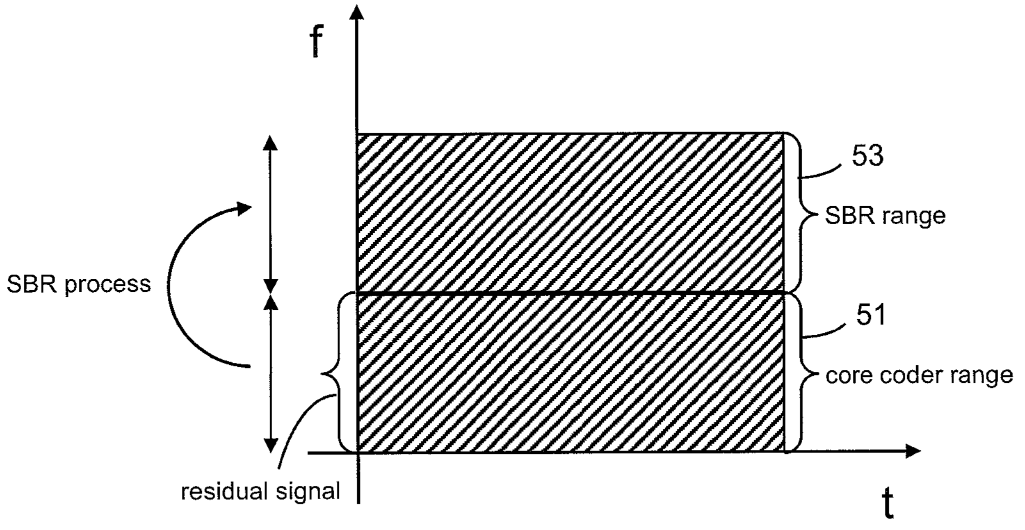

The advantage becomes even more apparent when operating on intermediate bitrates where the residual signal bandwidth approaches or is equal to the core coder bandwidth. In this case, the time frequency representation of FIG. 8*a* (where the order of PS encoding and SBR encoding as shown in FIG. 6 is used) results in the time frequency representation shown in FIG. 8*c*. In FIG. 8*c*, the residual signal essentially covers the entire lowband range 51 of the core coder; in the SBR frequency range 53 the decorrelated signal is used by the PS decoder. In FIG. 8*d*, the time frequency representation in case of the preferred order of the encoding/decoding modules (i.e. SBR encoding operating on a stereo signal before PS encoding, as shown in FIG. 7) is visualized. Here, the PS decoding module operates prior to the SBR decoding module in the decoder, as shown in FIG. 15. Thus, the residual signal is part of the low band used for high frequency reconstruction. When the residual signal bandwidth equals that of the mono downmix signal bandwidth, no decorrelated signal information will be needed to decoder the output signal (see the full frequency range being hatched in FIG. 8*d*).

In FIG. 9*a*, an embodiment of the stereo core encoder 48 with adaptively selectable L/R or M/S stereo encoding in the MDCT transform domain is illustrated. Such stereo encoder 48 may be used in FIGS. 6 and 7. A mono core encoder 34 as shown in FIG. 5 can be considered as a special case of the stereo core encoder 48 in FIG. 9*a*, where only a single mono input channel is processed (i.e. where the second input channel, shown as dashed line in FIG. 9*a*, is not present).

In FIG. 9*b*, an embodiment of a more generalized encoder is illustrated. For mono signals, encoding can be switched between coding in a linear predictive domain (see block 71) and coding in a transform domain (see block 48). Such type of core coder introduces several coding methods which can adaptively be used dependent upon the characteristics of the input signal. Here, the coder can choose to code the signal using either an AAC style transform coder 48 (available for mono and stereo signals, with adaptively selectable L/R or M/S coding in case of stereo signals) or an AMR-WB+ (Adaptive Multi Rate—WideBand Plus) style core coder 71 (only available for mono signals). The AMR-WB+ core coder 71 evaluates the residual of a linear predictor 72, and in turn also chooses between a transform coding approach of the linear prediction residual or a classic speech coder ACELP (Algebraic Code Excited Linear Prediction) approach for coding the linear prediction residual. For deciding between AAC style transform coder 48 and the AMR-WB+ style core coder 71, a mode decision stage 73 is used which decides based on the input signal between both coders 48 and 71.

The encoder 48 is a stereo AAC style MDCT based coder. When the mode decision 73 steers the input signal to use MDCT based coding, the mono input signal or the stereo input signals are coded by the AAC based MDCT coder 48. The MDCT coder 48 does an MDCT analysis of the one or two signals in MDCT stages 74. In case of a stereo signal, further, an M/S or L/R decision on a frequency band basis is performed in a stage 75 prior to quantization and coding. L/R stereo encoding or M/S stereo encoding is selectable in a frequency-variant manner. The stage 75 also performs a L/R to M/S transform. If M/S encoding is decided for a particular frequency band, the stage 75 outputs an M/S signal for this frequency band. Otherwise, the stage 75 outputs a L/R signal for this frequency band.

Hence, when the transform coding mode is used, the full efficiency of the stereo coding functionality of the underlying core coder can be used for stereo.

When the mode decision 73 steers the mono signal to the linear predictive domain coder 71, the mono signal is subsequently analyzed by means of linear predictive analysis in block 72. Subsequently, a decision is made on whether to code the LP residual by means of a time-domain ACELP style coder 76 or a TCX style coder 77 (Transform Coded eXcitation) operating in the MDCT domain. The linear predictive domain coder 71 does not have any inherent stereo coding capability. Hence, to allow coding of stereo signal with the linear predictive domain coder 71, an encoder configuration similar to that shown in FIG. 5 can be used. In this configuration, a PS encoder generates PS parameters 5 and a mono downmix signal DMX, which is then encoded by the linear predictive domain coder.

FIG. 10 illustrates a further embodiment of an encoder system, wherein parts of FIG. 7 and FIG. 9 are combined in a new fashion. The DMX/RES to pseudo L/R block 2, as outlined in FIG. 7, is arranged within the AAC style downmix coder 70 prior to the stereo MDCT analysis 74. This embodiment has the advantage that the DMX/RES to pseudo L/R transform 2 is applied only when the stereo MDCT core coder is used. Hence, when the transform coding mode is used, the full efficiency of the stereo coding functionality of the underlying core coder can be used for stereo coding of the frequency range covered by the residual signal.

While the mode decision 73 in FIG. 9*b* operates either on the mono input signal or on the input stereo signal, the mode decision 73' in FIG. 10 operates on the downmix signal DMX and the residual signal RES. In case of a mono input signal, the mono signal can directly be used as the DMX signal, the RES signal is set to zero, and the PS parameters can default to IID=0 dB and ICC=1.

When the mode decision 73' steers the downmix signal DMX to the linear predictive domain coder 71, the downmix signal DMX is subsequently analyzed by means of linear predictive analysis in block 72. Subsequently, a decision is made on whether to code the LP residual by means of a time-domain ACELP style coder 76 or a TCX style coder 77 (Transform Coded eXcitation) operating in the MDCT domain. The linear predictive domain coder 71 does not have any inherent stereo coding capability that can be used for coding the residual signal in addition to the downmix signal DMX. Hence, a dedicated residual coder 78 is employed for encoding the residual signal RES when the downmix signal DMX is encoded by the predictive domain coder 71. E.g. such coder 78 may be a mono AAC coder.

It should be noted that the coder 71 and 78 in FIG. 10 may be omitted (in this case the mode decision stage 73' is not necessary anymore).

FIG. 11*a* illustrates a detail of an alternative further embodiment of an encoder system which achieves the same advantage as the embodiment in FIG. 10. In contrast to the embodiment of FIG. 10, in FIG. 11*a* the DMX/RES to pseudo L/R transform 2 is placed after the MDCT analysis 74 of the core coder 70, i.e. the transform operates in the MDCT domain. The transform in block 2 is linear and time-invariant and thus can be placed after the MDCT analysis 74. The remaining blocks of FIG. 10 which are not shown in FIG. 11 can be optionally added in the same way in FIG. 11*a*. The MDCT analysis blocks 74 may be also alternatively placed after the transform block 2.

FIG. 11*b* illustrates an implementation of the embodiment in FIG. 11*a*. In FIG. 11*b*, an exemplary implementation of the stage 75 for selecting between M/S or L/R encoding is shown. The stage 75 comprises a sum and difference transform stage 98 (more precisely a L/R to M/S transform stage) which receives the pseudo stereo signal $L_p$, $R_p$. The transform stage 98 generates a pseudo mid/side signal $M_p$, $S_p$ by performing an L/R to M/S transform. Except for a possible gain factor, the following applies: $M_p$=DMX and $S_p$=RES.

The stage 75 decides between L/R or M/S encoding. Based on the decision, either the pseudo stereo signal $L_p$, $R_p$ or the pseudo mid/side signal $M_p$, $S_p$ are selected (see selection switch) and encoded in AAC block 97. It should be noted that also two AAC blocks 97 may be used (not shown in FIG. 11*b*), with the first AAC block 97 assigned to the pseudo stereo signal $L_p$, $R_p$ and the second AAC block 97 assigned to the pseudo mid/side signal $M_p$, $S_p$. In this case, the L/R or M/S selection is performed by selecting either the output of the first AAC block 97 or the output of the second AAC block 97.

FIG. 11*c* shows an alternative to the embodiment in FIG. 11*a*. Here, no explicit transform stage 2 is used. Rather, the transform stage 2 and the stage 75 is combined in a single stage 75'. The downmix signal DMX and the residual signal RES are fed to a sum and difference transform stage 99 (more precisely a DMX/RES to pseudo L/R transform stage) as part of stage 75'. The transform stage 99 generates a pseudo stereo signal $L_p$, $R_p$. The DMX/RES to pseudo L/R transform stage 99 in FIG. 11*c* is similar to the L/R to M/S transform stage 98 in FIG. 11*b* (expect for a possibly different gain factor). Nevertheless, in FIG. 11*c* the selection between M/S and L/R decoding needs to be inverted in comparison to FIG. 11*b*. Note that in both FIG. 11*b* and FIG. 11*c*, the position of the switch for the L/R or M/S selection is shown in $L_p/R_p$ position, which is the upper one in FIG. 11*b* and the lower one in FIG. 11*c*. This visualizes the notion of the inverted meaning of the L/R or M/S selection.

It should be noted that the switch in FIGS. 11*b* and 11*c* preferably exists individually for each frequency band in the MDCT domain such that the selection between L/R and M/S can be both time- and frequency-variant. In other words: the position of the switch is preferably frequency-variant. The transform stages 98 and 99 may transform the whole used frequency range or may only transform a single frequency band.

Moreover, it should be noted that all blocks 2, 98 and 99 can be called "sum and difference transform blocks" since all blocks implement a transform matrix in the form of $$c\cdot\begin{pmatrix}1 & 1\\ 1 & -1\end{pmatrix}$$

Merely, the gain factor c may be different in the blocks 2, 98, 99.

In FIG. 12, a further embodiment of an encoder system is outlined. It uses an extended set of PS parameters which, in addition to IID an ICC (described above), includes two further parameters IPD (inter channel phase difference, see $\varphi_{ipd}$ below) and OPD (overall phase difference, see $\varphi_{opd}$ below) that allow to characterize the phase relationship between the two channels L and R of a stereo signal. An example for these phase parameters is given in ISO/IEC 14496-3 subclause 8.6.4.6.3 which is hereby incorporated by reference. When phase parameters are used, the resulting upmix matrix $H_{COMPLEX}$ (and its inverse $H_{COMPLEX}^{-1}$) becomes complex-valued, according to:

$$H_{COMPLEX} = H_\phi \cdot H,$$

where $$H_\phi = \begin{pmatrix}\exp(j\varphi_1) & 0\\ 0 & \exp(j\varphi_2)\end{pmatrix},$$

and where $$\varphi_1 = \varphi_{opd}$$

$$\varphi_2 = \varphi_{opd} - \varphi_{ipd}.$$

The stage 80 of the PS encoder which operates in the complex QMF domain only takes care of phase dependencies between the channels L, R. The downmix rotation (i.e. the transformation from the L/R domain to the DMX/RES domain which was described by the matrix $H^{-1}$ above) is taken care of in the MDCT domain as part of the stereo core coder 81. Hence, the phase dependencies between the two channels are extracted in the complex QMF domain, while other, real-valued, waveform dependencies are extracted in the real-valued critically sampled MDCT domain as part of the stereo coding mechanism of the core coder used. This has the advantage that the extraction of linear dependencies between the channels can be tightly integrated in the stereo coding of the core coder (though, to prevent aliasing in the critical sampled MDCT domain, only for the frequency range that is covered by residual coding, possibly minus a "guard band" on the frequency axis).

The phase adjustment stage 80 of the PS encoder in FIG. 12 extracts phase related PS parameters, e.g. the parameters IPD (inter channel phase difference) and OPD (overall phase difference). Hence, the phase adjustment matrix $H_\phi^{-1}$ that it produces may be according to the following:

$$H_\phi^{-1} = \begin{pmatrix}\exp(-j\varphi_1) & 0\\ 0 & \exp(-j\varphi_2)\end{pmatrix}$$

As discussed before, the downmix rotation part of the PS module is dealt with in the stereo coding module 81 of the core coder in FIG. 12. The stereo coding module 81 operates in the MDCT domain and is shown in FIG. 13. The stereo coding module 81 receives the phase adjusted stereo signal $L_\varphi$, $R_\varphi$ in the MDCT domain. This signal is downmixed in a downmix stage 82 by a downmix rotation matrix $H^{-1}$ which is the real-valued part of a complex downmix matrix $H_{COMPLEX}^{-1}$ as discussed above, thereby generating the downmix signal DMX and residual signal RES. The downmix operation is followed by the inverse L/R to M/S transform according to the present application (see transform stage 2), thereby generating a pseudo stereo signal $L_p$, $R_p$. The pseudo stereo signal $L_p$, $R_p$ is processed by the stereo coding algorithm (see adaptive M/S or L/R stereo encoder 83), in this particular embodiment a stereo coding mechanism that depending on perceptual entropy criteria decides to code either an L/R representation or an M/S representation of the signal. This decision is preferably time- and frequency-variant.

In FIG. 14 an embodiment of a decoder system is shown which is suitable to decode a bitstream 46 as generated by the encoder system shown in FIG. 6. This embodiment is merely illustrative for the principles of the present application. It is understood that modifications and variations of the embodiment will be apparent to others skilled in the art. A core decoder 90 decodes the bitstream 46 into pseudo left and right channels, which are transformed in the QMF domain by filter banks 91. Subsequently, a fixed pseudo L/R to DMX/RES transform of the resulting pseudo stereo signal $L_p$, $R_p$ is performed in transform stage 12, thus creating a downmix signal DMX and a residual signal RES. When using SBR coding, these signals are low band signals, e.g. the downmix signal DMX and residual signal RES may only contain audio information for the low frequency band up to approximately 8 kHz. The downmix signal DMX is used by an SBR decoder 93 to reconstruct the high frequency band based on received SBR parameters (not shown). Both the output signal (including the low and reconstructed high frequency bands of the downmix signal DMX) from the SBR decoder 93 and the residual signal RES are input to a PS decoder 94 operating in the QMF domain (in particular in the hybrid QMF+Nyquist filter domain). The downmix signal DMX at the input of the PS decoder 94 also contains audio information in the high frequency band (e.g. up to 20 kHz), whereas the residual signal RES at the input of the PS decoder 94 is a low band signal (e.g. limited up to 8 kHz). Thus, for the high frequency band (e.g. for the band from 8 kHz to 20 kHz), the PS decoder 94 uses a decorrelated version of the downmix signal DMX instead of using the band limited residual signal RES. The decoded signals at the output of the PS decoder 94 are therefore based on a residual signal only up to 8 kHz. After PS decoding, the two output channels of the PS decoder 94 are transformed in the time domain by filter banks 95, thereby generating the output stereo signal L, R.

In FIG. 15 an embodiment of a decoder system is shown which is suitable to decode the bitstream 46 as generated by the encoder system shown in FIG. 7. This embodiment is merely illustrative for the principles of the present application. It is understood that modifications and variations of the embodiment will be apparent to others skilled in the art. The principle operation of the embodiment in FIG. 15 is similar to that of the decoder system outlined in FIG. 14. In contrast to FIG. 14, the SBR decoder 96 in FIG. 15 is located at the output of the PS decoder 94. Moreover, the SBR decoder makes use of SBR parameters (not shown) forming stereo envelope data in contrast to the mono SBR parameters in FIG. 14. The downmix and residual signal at the input of the PS decoder 94 are typically low band signals, e.g. the downmix signal DMX and residual signal RES may contain audio information only for the low frequency band, e.g. up to approximately 8 kHz. Based on the low band downmix signal DMX and residual signal RES, the PS encoder 94 determines a low band stereo signal, e.g. up to approximately 8 kHz. Based on the low band stereo signal and stereo SBR parameters, the SBR decoder 96 reconstructs the high frequency part of the stereo signal. In comparison to the embodiment in FIG. 14, the embodiment in FIG. 15 offers the advantage that no decorrelated signal is needed (see also FIG. 8*d*) and thus an enhanced audio quality is achieved, whereas in FIG. 14 for the high frequency part a decorrelated signal is needed (see also FIG. 8*c*), thereby reducing the audio quality.

FIG. 16*a* shows an embodiment of a decoding system which is inverse to the encoding system shown in FIG. 11*a*. The incoming bitstream signal is fed to a decoder block 100, which generates a first decoded signal 102 and a second decoded signal 103. At the encoder either M/S coding or L/R coding was selected. This is indicated in the received bitstream. Based on this information, either M/S or L/R is selected in the selection stage 101. In case M/S was selected in the encoder, the first 102 and second 103 signals are converted into a (pseudo) L/R signal. In case L/R was selected in the encoder, the first 102 and second 103 signals may pass the stage 101 without transformation. The pseudo L/R signal $L_p$, $R_p$ at the output of stage 101 is converted into an DMX/RES signal by the transform stage 12 (this stage quasi performs a L/R to M/S transform). Preferably, the stages 100, 101 and 12 in FIG. 16*a* operate in the MDCT domain. For transforming the downmix signal DMX and residual signals RES into the time domain, conversion blocks 104 may be used. Thereafter, the resulting signal is fed to a PS decoder (not shown) and optionally to an SBR decoder as shown in FIGS. 14 and 15. The blocks 104 may be also alternatively placed before block 12.

FIG. 16*b* illustrates an implementation of the embodiment in FIG. 16*a*. In FIG. 16*b*, an exemplary implementation of the stage 101 for selecting between M/S or L/R decoding is shown. The stage 101 comprises a sum and difference transform stage 105 (M/S to L/R transform) which receives the first 102 and second 103 signals.

Based on the encoding information given in the bitstream, the stage 101 selects either L/R or M/S decoding. When L/R decoding is selected, the output signal of the decoding block 100 is fed to the transform stage 12.

FIG. 16*c* shows an alternative to the embodiment in FIG. 16*a*. Here, no explicit transform stage 12 is used. Rather, the transform stage 12 and the stage 101 are merged in a single stage 101'. The first 102 and second 103 signals are fed to a sum and difference transform stage 105' (more precisely a pseudo L/R to DMX/RES transform stage) as part of stage 101'. The transform stage 105' generates a DMX/RES signal. The transform stage 105' in FIG. 16*c* is similar or identical to the transform stage 105 in FIG. 16*b* (expect for a possibly different gain factor). In FIG. 16*c* the selection between M/S and L/R decoding needs to be inverted in comparison to FIG. 16*b*. In FIG. 16*c* the switch is in the lower position, whereas in FIG. 16*b* the switch is in the upper position. This visualizes the inversion of the L/R or M/S selection (the selection signal may be simply inverted by an inverter).

It should be noted that the switch in FIGS. 16*b* and 16*c* preferably exists individually for each frequency band in the MDCT domain such that the selection between L/R and M/S can be both time- and frequency-variant. The transform stages 105 and 105' may transform the whole used frequency range or may only transform a single frequency band.

FIG. 17 shows a further embodiment of an encoding system for coding a stereo signal L, R into a bitstream signal. The encoding system comprises a downmix stage 8 for generating a downmix signal DMX and a residual signal RES based on the stereo signal. Further, the encoding system comprises a parameter determining stage 9 for determining one or more parametric stereo parameters 5. Further, the encoding system comprises means 110 for perceptual encoding downstream of the downmix stage 8. The encoding is selectable:

- encoding based on a sum signal of the downmix signal DMX and the residual signal RES and based on a difference signal of the downmix signal DMX and the residual signal RES, or
- encoding based on the downmix signal DMX and the residual signal RES.

Preferably, the selection is time- and frequency-variant.

The encoding means 110 comprises a sum and difference transform stage 111 which generates the sum and difference signals. Further, the encoding means 110 comprise a selection block 112 for selecting encoding based on the sum and difference signals or based on the downmix signal DMX and the residual signal RES. Furthermore, an encoding block 113 is provided. Alternatively, two encoding blocks 113 may be used, with the first encoding block 113 encoding the DMX and RES signals and the second encoding block 113 encoding the sum and difference signals. In this case the selection 112 is downstream of the two encoding blocks 113.

The sum and difference transform in block 111 is of the form $$c\cdot\begin{pmatrix}1 & 1\\ 1 & -1\end{pmatrix}$$

The transform block 111 may correspond to transform block 99 in FIG. 11*c*.

The output of the perceptual encoder 110 is combined with the parametric stereo parameters 5 in the multiplexer 7 to form the resulting bitstream 6.

In contrast to the structure in FIG. 17, encoding based on the downmix signal DMX and residual signal RES may be realized when encoding a resulting signal which is generated by transforming the downmix signal DMX and residual signal RES by two serial sum and difference transforms as shown in FIG. 11*b* (see the two transform blocks 2 and 98). The resulting signal after two sum and difference transforms corresponds to the downmix signal DMX and residual signal RES (except for a possible different gain factor).

FIG. 18 shows an embodiment of a decoder system which is inverse to the encoder system in FIG. 17. The decoder system comprises means 120 for perceptual decoding based on bitstream signal. Before decoding, the PS parameters are separated from the bitstream signal 6 in demultiplexer 10. The decoding means 120 comprise a core decoder 121 which generates a first signal 122 and a second signal 123 (by decoding). The decoding means output a downmix signal DMX and a residual signal RES.

The downmix signal DMX and the residual signal RES are selectively

- based on the sum of the first signal 122 and of the second signal 123 and based on the difference of the first signal 122 and of the second signal 123 or
- based on the first signal 122 and based on the second signal 123.

Preferably, the selection is time- and frequency-variant. The selection is performed in the selection stage 125.

The decoding means 120 comprise a sum and difference transform stage 124 which generates sum and difference signals.

The sum and difference transform in block 124 is of the form $$c\cdot\begin{pmatrix}1 & 1\\ 1 & -1\end{pmatrix}$$

The transform block 124 may correspond to transform block 105' in FIG. 16*c*.

After selection, the DMX and RES signals are fed to an upmix stage 126 for generating the stereo signal L, R based on the downmix signal DMX and the residual signal RES. The upmix operation is dependent on the PS parameters 5.

Preferably, in FIGS. 17 and 18 the selection is frequency-variant. In FIG. 17, e.g. a time to frequency transform (e.g. by a MDCT or analysis filter bank) may be performed as first step in the perceptual encoding means 110. In FIG. 18, e.g. a frequency to time transform (e.g. by an inverse MDCT or synthesis filter bank) may be performed as the last step in the perceptual decoding means 120.

It should be noted that in the above-described embodiments, the signals, parameters and matrices may be frequency-variant or frequency-invariant and/or time-variant or time-invariant. The described computing steps may be carried out frequency-wise or for the complete audio band.

Moreover, it should be noted that the various sum and difference transforms, i.e. the DMX/RES to pseudo L/R transform, the pseudo L/R to DMX/RES transform, the L/R to M/S transform and the M/S to L/R transform, are all of the form $$c\cdot\begin{pmatrix}1 & 1\\ 1 & -1\end{pmatrix}$$

Merely, the gain factor c may be different. Therefore, in principle, each of these transforms may be exchanged by a different transform of these transforms. If the gain is not correct during the encoding processing, this may be compensated in the decoding process. Moreover, when placing two same or two different of the sum and difference transforms is series, the resulting transform corresponds to the identity matrix (possibly, multiplied by a gain factor).

In an encoder system comprising both a PS encoder and a SBR encoder, different PS/SBR configurations are possible. In a first configuration, shown in FIG. 6, the SBR encoder 32 is connected downstream of the PS encoder 41. In a second configuration, shown in FIG. 7, the SBR encoder 42 is connected upstream of the PS encoder 41. Depending upon e.g. the desired target bitrate, the properties of the core encoder, and/or one or more various other factors, one of the configurations can be preferred over the other in order to provide best performance. Typically, for lower bitrates, the first configuration can be preferred, while for higher bitrates, the second configuration can be preferred. Hence, it is desirable if an encoder system supports both different configurations to be able to choose a preferred configuration depending upon e.g. desired target bitrate and/or one or more other criteria.

Also in a decoder system comprising both a PS decoder and a SBR decoder, different PS/SBR configurations are possible. In a first configuration, shown in FIG. 14, the SBR decoder 93 is connected upstream of the PS decoder 94. In a second configuration, shown in FIG. 15, the SBR decoder 96 is connected downstream of the PS decoder 94. In order to achieve correct operation, the configuration of the decoder system has to match that of the encoder system. If the encoder is configured according to FIG. 6, then the decoder is correspondingly configured according to FIG. 14. If the encoder is configured according to FIG. 7, then the decoder is correspondingly configured according to FIG. 15. In order to ensure correct operation, the encoder preferably signals to the decoder which PS/SBR configuration was chosen for encoding (and thus which PS/SBR configuration is to be chosen for decoding). Based on this information, the decoder selects the appropriate decoder configuration.

As discussed above, in order to ensure correct decoder operation, there is preferably a mechanism to signal from the encoder to the decoder which configuration is to be used in the decoder. This can be done explicitly (e.g. by means of an dedicated bit or field in the configuration header of the bitstream as discussed below) or implicitly (e.g. by checking whether the SBR data is mono or stereo in case of PS data being present).

As discussed above, to signal the chosen PS/SBR configuration, a dedicated element in the bitstream header of the bitstream conveyed from the encoder to the decoder may be used. Such a bitstream header carries necessary configuration information that is needed to enable the decoder to correctly decode the data in the bitstream. The dedicated element in the bitstream header may be e.g. a one bit flag, a field, or it may be an index pointing to a specific entry in a table that specifies different decoder configurations.

Instead of including in the bitstream header an additional dedicated element for signaling the PS/SBR configuration, information already present in the bitstream may be evaluated at the decoding system for selecting the correct PS/SBR configuration. E.g. the chosen PS/SBR configuration may be derived from bitstream header configuration information for the PS decoder and SBR decoder. This configuration information typically indicates whether the SBR decoder is to be configured for mono operation or stereo operation. If, for example, a PS decoder is enabled and the SBR decoder is configured for mono operation (as indicated in the configuration information), the PS/SBR configuration according to FIG. 14 can be selected. If a PS decoder is enabled and the SBR decoder is configured for stereo operation, the PS/SBR configuration according to FIG. 15 can be selected.

The above-described embodiments are merely illustrative for the principles of the present application. It is understood that modifications and variations of the arrangements and the details described herein will be apparent to others skilled in the art. It is the intent, therefore, that the scope of the application is not limited by the specific details presented by way of description and explanation of the embodiments herein.

The systems and methods disclosed in the application may be implemented as software, firmware, hardware or a combination thereof. Certain components or all components may be implemented as software running on a digital signal processor or microprocessor, or implemented as hardware and or as application specific integrated circuits.

Typical devices making use of the disclosed systems and methods are portable audio players, mobile communication devices, set-top-boxes, TV-sets, AVRs (audio-video receiver), personal computers etc.

The invention claimed is:

1. An audio signal processing device for encoding a stereo signal to a bitstream signal, the audio signal processing device comprising one or more components that:

generate a downmix signal, a residual signal, and one or more parametric stereo parameters based on the stereo signal, wherein the residual signal indicates an error associated with representing the stereo signal by the downmix signal and the one or more parametric stereo parameters and wherein the one or more parametric stereo parameters comprise a parameter indicating a channel level difference;

generate an SBR encoded downmix signal and mono SBR parameters in response to the downmix signal;

generate, in a frequency-variant or frequency-invariant manner, a first signal and a second signal based on either:

a sum of the SBR encoded downmix signal and the residual signal and a difference of the SBR encoded downmix signal and the residual signal; or the downmix signal and the residual signal;

generate an encoded stereo signal by perceptual encoding the first signal and the second signal; and generate the bitstream signal by combining the one or more parametric stereo parameters, the mono SBR parameters, and the encoded stereo signal.

2. The audio signal processing device of claim 1, wherein perceptual encoding comprises:

performing a transform based on the SBR encoded downmix signal and the residual signal, thereby generating a pseudo left/right stereo signal; and encoding the pseudo left/right stereo signal, wherein the perceptual encoding comprises selecting, in a frequency-variant or frequency-invariant manner, between either:

left/right perceptual encoding or mid/side perceptual encoding.

3. The audio signal processing device of claim 2, wherein perceptual encoding comprises selecting, in a frequency-variant or frequency-invariant manner and based on the pseudo left/right stereo signal, between either:

left/right encoding or mid/side encoding.

4. The audio signal processing device of claim 2, wherein performing a transform comprises performing a left/right to mid/side transform based on the pseudo left/right stereo signal.

5. The audio signal processing device of claim 1, comprising one or more components that:

perform a transform based on the SBR encoded downmix signal and the residual signal, thereby generating a pseudo left/right stereo signal; and encode, in a frequency-variant or frequency-invariant manner, the pseudo left/right stereo signal, wherein the encoding selects:

left/right perceptual encoding or mid/side perceptual encoding.

6. The audio signal processing device of claim 5, comprising one or more components that:

decide between L/R perceptual encoding and M/S perceptual encoding in a frequency-variant or frequency-invariant manner;

encode based on the downmix signal and residual signal when M/S perceptual decoding is decided, and encode based on the sum and difference when L/R perceptual decoding is decided.

7. A audio signal processing device for decoding a bitstream signal including mono SBR parameters and one or more parametric stereo parameters to a stereo signal, the audio signal processing device comprising one or more components that:

generate a first signal and a second signal by perceptual decoding the bitstream signal;

generate, in a frequency-variant or frequency-invariant manner, a downmix signal and a residual signal based on either:

a sum of the first signal and of the second signal and a difference of the first signal and of the second signal; or the first signal and the second signal;

wherein the residual signal indicates an error associated with representing the first signal and the second signal by the downmix signal and the one or more parametric stereo parameters and wherein the one or more parametric stereo parameters comprise a parameter indicating a channel level difference; and generate an SBR decoded downmix signal in response to the downmix signal and the mono SBR parameters;

generate the stereo signal based on the SBR decoded downmix signal and the residual signal by an upmix operation, with the upmix operation being dependent on the one or more parametric stereo parameters.

8. The audio signal processing device of claim 7, comprising one or more components that:

generate a pseudo stereo signal based on the bitstream signal;

selectively performing, in a frequency-variant or frequency-invariant manner, left/right perceptual decoding or mid/side perceptual decoding; and perform a transform based on the pseudo stereo signal, thereby generating the downmix signal and the residual signal.

9. The audio signal processing device of claim 8, comprising one or more components that perform a mid/side to left/right transform based on a pseudo mid/side signal.

10. The audio signal processing device of claim 7, comprising one or more components that perform a sum and difference transform based on the first signal and the second signal for one or more or all used frequency bands.

11. The audio signal processing device of claim 7, comprising one or more components that:

select between L/R perceptual decoding and M/S perceptual decoding in a frequency-variant or frequency-invariant manner;

select the downmix signal and the residual signal based on the sum of the first signal and of the second signal and based on the difference of the first signal and of the second signal when the L/R perceptual decoding is selected; and the downmix signal and the residual signal is selected to be based on the first signal and based on the second signal when the M/S perceptual decoding is selected.

12. A method, performed by an audio signal processing device, for decoding a bitstream signal including mono SBR parameters and one or more parametric stereo parameters to a stereo signal, the method comprising:

generating a first signal and a second signal by perceptual decoding the bitstream signal;

generating, in a frequency-variant or frequency-invariant manner, a downmix signal and a residual signal based on either:

a sum of the first signal and of the second signal and based on a difference of the first signal and of the second signal; or the first signal and the second signal;

wherein the residual signal indicates an error associated with representing the first signal and the second signal by the downmix signal and the one or more parametric stereo parameters and wherein the one or more parametric stereo parameters comprise a parameter indicating a channel level difference;

generating an SBR decoded downmix signal in response to the downmix signal and the mono SBR parameters;

generating the stereo signal based on the SBR decoded downmix signal and the residual signal by an upmix operation, with the upmix operation being dependent on the one or more parametric stereo parameters; and wherein the method is performed, at least in part, by one or more components of the audio signal processing device.

13. A non-transitory computer readable storage medium comprising a sequence of instructions, wherein, when executed by an audio signal processing device, the sequence of instructions causes the audio signal processing device to perform the method of claim 12.

* * * * *